US011511344B2

(12) United States Patent
Wang et al.

(10) Patent No.: US 11,511,344 B2
(45) Date of Patent: Nov. 29, 2022

(54) IRON NITRIDE POWDER WITH ANISOTROPIC SHAPE

(71) Applicant: REGENTS OF THE UNIVERSITY OF MINNESOTA, Minneapolis, MN (US)

(72) Inventors: Jian-Ping Wang, Shoreview, MN (US); YanFeng Jiang, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 184 days.

(21) Appl. No.: 16/737,156

(22) Filed: Jan. 8, 2020

(65) Prior Publication Data

US 2020/0139445 A1 May 7, 2020

Related U.S. Application Data

(62) Division of application No. 15/546,359, filed as application No. PCT/US2016/014578 on Jan. 22, 2016, now Pat. No. 10,562,103.

(Continued)

(51) Int. Cl.
*C01B 21/00* (2006.01)
*H01F 1/08* (2006.01)
(Continued)

(52) U.S. Cl.
CPC ................ *B22F 9/04* (2013.01); *B22F 1/054* (2022.01); *C01B 21/0622* (2013.01);
(Continued)

(58) Field of Classification Search
CPC .................................................. C01B 21/0622
See application file for complete search history.

(56) References Cited

U.S. PATENT DOCUMENTS

| | | | |
|---|---|---|---|
| 5,330,554 | A | 7/1994 | Koyano et al. |
| 2005/0208320 | A1 | 9/2005 | Masada et al. |

(Continued)

FOREIGN PATENT DOCUMENTS

| | | | |
|---|---|---|---|
| JP | 2013069926 A | 4/2013 | |
| WO | 2013/026007 A2 | 2/2013 | |

(Continued)

OTHER PUBLICATIONS

Ogawa et al., Challenge to the Synthesis of α"-Fe16N2 Compound Nanoparticle with High Saturation Magnetization for Rare Earth Free New Permanent Magnetic Material, 2013 Appl. Phys. Express 6 073007 (Year: 2013).*

(Continued)

*Primary Examiner* — Hoa (Holly) Le
(74) *Attorney, Agent, or Firm* — BakerHostetler

(57) ABSTRACT

Techniques are disclosed for milling an iron-containing raw material in the presence of a nitrogen source to generate anisotropically shaped particles that include iron nitride and have an aspect ratio of at least 1.4. Techniques for nitridizing an anisotropic particle including iron, and annealing an anisotropic particle including iron nitride to form at least one α"-$Fe_{16}N_2$ phase domain within the anisotropic particle including iron nitride also are disclosed. In addition, techniques for aligning and joining anisotropic particles to form a bulk material including iron nitride, such as a bulk permanent magnet including at least one α"-$Fe_{16}N_2$ phase domain, are described. Milling apparatuses utilizing elongated bars, an electric field, and a magnetic field also are disclosed.

15 Claims, 25 Drawing Sheets

Related U.S. Application Data

(60) Provisional application No. 62/107,748, filed on Jan. 26, 2015.

(51) Int. Cl.

| | |
|---|---|
| ***B22F 9/04*** | (2006.01) |
| ***C22C 33/02*** | (2006.01) |
| ***H01F 1/06*** | (2006.01) |
| ***B22F 1/054*** | (2022.01) |
| ***C01B 21/06*** | (2006.01) |
| ***C23C 8/26*** | (2006.01) |
| ***H01F 41/02*** | (2006.01) |

(52) U.S. Cl.

CPC ................ *C22C 33/02* (2013.01); *C23C 8/26* (2013.01); *H01F 1/065* (2013.01); *H01F 1/083* (2013.01); *H01F 1/086* (2013.01); *H01F 41/0266* (2013.01); *B22F 1/0551* (2022.01); *B22F 2009/045* (2013.01); *B22F 2998/10* (2013.01); *B22F 2999/00* (2013.01)

(56) References Cited

U.S. PATENT DOCUMENTS

2010/0035086 A1* 2/2010 Inoue ..................... G11B 5/714 428/811.2
2014/0001398 A1* 1/2014 Takahashi ............... H01F 1/065 252/62.56
2014/0085023 A1* 3/2014 Takahashi ........... C01B 21/0622 335/302
2014/0290434 A1 10/2014 Matthiesen
2015/0380135 A1* 12/2015 Wang ........................ H01F 1/10 428/220
2015/0380149 A1* 12/2015 Nakamura ............ H01F 27/255 336/233
2016/0042849 A1* 2/2016 Wang ........................ C21D 6/00 427/128
2016/0141082 A1 5/2016 Wang et al.
2016/0207769 A1 7/2016 Monson et al.
2017/0243680 A1* 8/2017 Wang ........................ H02K 1/02
2018/0025841 A1* 1/2018 Wang .................. H01F 41/0266 310/152

FOREIGN PATENT DOCUMENTS

WO 2014/124135 A2 8/2014
WO 2014210027 A1 12/2014

OTHER PUBLICATIONS

Tobise et al., Morphology and magnetic properties of αΔ-Fe16N2 nanoparticles synthesized from iron hydroxide and iron oxides, J. Magn. Soc. Jpn., 41, 58-62 (2017) (Year: 2017).*

International Search Report from PCT/US2016/014578 as prepared by the ISA/KR; dated Apr. 25, 2016.

Chen et al. , A Influence of milling temperature and atmosphere on the synthesis of iron nitrides by ball milling, Materials Science and Engineering A206 (1996) 24-29 (Year: 1996) [Cited in related U.S. Appl. No. 15/546,359].

Poudyal et al., Field-ball milling induced anisotropy in magnetic particles, J. Phys. D: Appl. Phys. 37 (2004) L45-L48 (Year: 2004) [Cited in related U.S. Appl. No. 15/546,359].

Nagesha et al., A Review On Mechanical Alloying, International Journal of Engineering Research and Applications (IJERA) vol. 3, Issue 3, May-Jun. 2013, pp. 921-924 (Year: 2013) [Cited in related U.S. Appl. No. 15/546,359].

* cited by examiner

FeN 90

FeN 91

FeN 92

FeN 93

FeN 90

FeN 91

FeN 92

FeN 93

IRON NITRIDE POWDER WITH ANISOTROPIC SHAPE

CROSS-REFERENCE TO RELATED APPLICATIONS

This application is a divisional of U.S. patent application Ser. No. 15/546,359; filed Jul. 26, 2017, which is 371 National Phase of International Application No. PCT/US2016/014578; filed Jan. 22, 2016, which claims the benefit of U.S. Provisional Patent Application No. 62/107,748, filed Jan. 26, 2015, the entire contents of which are incorporated herein by reference for all purposes.

GOVERNMENT INTEREST IN INVENTION

This invention was made with government support under contract number DE-AR0000199 awarded by DOE, Office of ARPA-E. The Government has certain rights in this invention.

TECHNICAL FIELD

The disclosure relates to techniques for forming iron nitride magnetic materials.

BACKGROUND

Permanent magnets can provide high efficiency and reliability for renewable energy technologies, including electrical vehicles and wind turbines, etc. Because rare earth permanent magnets have supply constraints and high price, a new magnet with more abundant and less strategically important elements is desired to replace rare earth magnets.

SUMMARY

Materials including α"-$Fe_{16}N_2$ are promising candidates for rare-earth-free magnets. This disclosure describes techniques that include milling an iron-containing raw material in the presence of a nitrogen source to nitridize the iron-containing raw material and form anisotropically shaped particles including iron nitride. In some examples, the anisotropically shaped particles may include a $Fe_{16}N_2$ phase constitution (e.g., α"-$Fe_{16}N_2$). Anisotropic particles including $Fe_{16}N_2$ may have enhanced magnetic properties, including, for example, at least one of enhanced coercivity, magnetization, magnetic orientation, or energy product, as compared to isotropically shaped particles including $Fe_{16}N_2$.

In some examples, milling may be controlled in one or more ways to cause the raw material to form anisotropic particles. In some examples, anisotropic particles may have an aspect ratio of at least 1.4. As used herein, aspect ratio is defined as the ratio of the length of a longest dimension to the length of a shortest dimension of the anisotropic particle, where the longest dimension and shortest dimension are substantially orthogonal. For example, the disclosure describes techniques including milling an iron-containing raw material in the presence of a nitrogen source for a predetermined period of time, under a predetermined amount of pressure, at a predetermined low temperature, or using a combination of two or more of these techniques. In some examples, an iron-containing raw material may be milled in the presence of a nitrogen source and a magnetic or electric field to form anisotropic particles. In some examples, iron-containing raw material may be milled in the presence of nitrogen using elongated bars housed within a bin configured to roll and/or vibrate, such that a powder with smaller sized particles including iron nitride is generated. In addition, anisotropic particles including iron nitride may be joined to form a bulk material having enhanced magnetic properties.

The disclosure also describes apparatuses configured to mill raw materials and form anisotropic particles. For example, a bar milling apparatus, an electro-discharge assisted milling apparatus, and a magnetic assisted milling apparatus are disclosed. In some examples, such apparatuses may be examples of types of rolling mode milling apparatuses, stirring mode milling apparatuses, or vibration mode milling apparatuses, as described in greater detail below.

In some examples, the disclosure describes a technique that includes milling an iron-containing raw material in the presence of a nitrogen source to generate a powder including a plurality of anisotropic particles, wherein at least some particles of the plurality of anisotropic particles include iron nitride, wherein at least some particles of the plurality of anisotropic particles have an aspect ratio of at least 1.4. Further, an aspect ratio for an anisotropic particle of the plurality of anisotropic particles may include the ratio of the length of a longest dimension to the length of a shortest dimension of the anisotropic particle, where the longest dimension and the shortest dimension are substantially orthogonal. In addition example, the disclosure describes an example bulk permanent magnet formed by any of the techniques described herein.

In another example, the disclosure describes a material that includes an anisotropic particle including at least one iron nitride crystal, where the anisotropic particle has an aspect ratio of at least 1.4. Again, the aspect ratio may include the ratio of the length of a longest dimension of the anisotropic particle to the length of a shortest dimension of the anisotropic particle, where the longest dimension and the shortest dimension are substantially orthogonal.

In another example, the disclosure describes nitridizing an anisotropic particle including iron to form an anisotropic particle including iron nitride, and annealing the anisotropic particle including iron nitride to form at least one α"-$Fe_{16}N_2$ phase domain within the anisotropic particle including iron nitride, where the anisotropic particle including iron nitride has an aspect ratio of at least 1.4, where the aspect ratio for the anisotropic particle including iron nitride comprises the ratio of the length of a longest dimension to the length of a shortest dimension of the anisotropic particle including iron nitride, and where the longest dimension and the shortest dimension are substantially orthogonal.

In another example, the disclosure describes a technique that includes aligning a plurality of anisotropic particles, such that the longest dimensions of respective anisotropic particles of the plurality of anisotropic particles are substantially parallel, where at least some anisotropic particles of the plurality of anisotropic particles comprise iron nitride and have an aspect ratio of at least 1.4. Again, the aspect ratio may include the ratio of the length of the longest dimension of an anisotropic particle to the length of the shortest dimension of the anisotropic particle, where the longest dimension and the shortest dimension are substantially orthogonal. This example technique also may include joining the plurality of anisotropic particles to form a bulk material that includes iron nitride.

This disclosure also describes an example apparatus that includes a plurality of elongated bars, where at least some of elongated bars of the plurality of elongated bars have a width between about 5 millimeters (mm) and about 50 mm, a bin configured to house the plurality of elongated bars, at least one support structure configured to support the bin, and a means for rotating the bin about an axis of the bin.

In addition, the disclosure describes an example apparatus that includes a plurality of milling media, a bin configured to house the plurality of milling media, and a generator that includes at least one of a spark discharge mode or a glow discharge mode, where the generator is configured to generate an electric field within the bin. This example apparatus also may include a first wire including a first end and a second end, wherein the first end of the first wire is affixed to at least one milling medium and the second end of the first wire is electrically coupled to a first terminal of the generator, and a second wire that includes a first end and a second end, wherein the first end of the second wire is electrically coupled to the bin and a ground and the second end of the second wire is electrically coupled to a second terminal of the generator. This example apparatus further may include at least one support structure configured to support the bin, and a means for rotating the bin about an axis of the bin.

Moreover, this disclosure also describes an example apparatus that includes a plurality of milling media, a bin configured to house the plurality of milling media, a means for generating a magnetic field within the bin, at least one support structure configured to support the bin, and a means for rotating the bin about an axis of the bin.

In addition, the disclosure describes workpieces including the anisotropic particles made by any of the techniques described herein. Workpieces may take a number of forms, such as a wire, rod, bar, conduit, hollow conduit, film, sheet, or fiber, each of which may have a wide variety of cross-sectional shapes and sizes, as well as any combinations thereof.

The details of one or more examples are set forth in the accompanying drawings and the description below. Other features, objects, and advantages will be apparent from the description and drawings, and from the claims.

DETAILED DESCRIPTION

Figure 1:
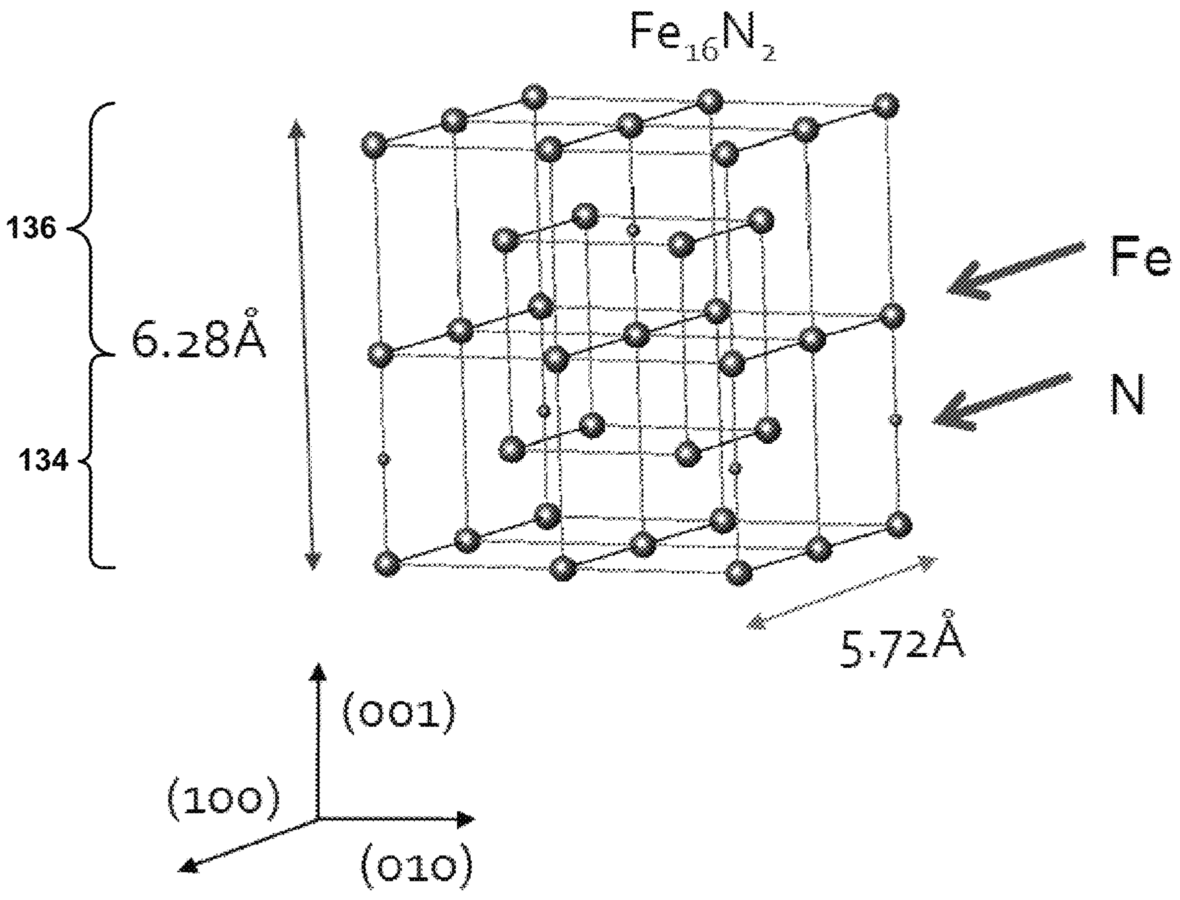
FIG. 1 is a conceptual diagram illustrating an example $Fe_{16}N_2$ iron nitride crystal.

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular examples and is not intended to be limiting of the claims. When a range of values is expressed, another example includes from the one particular value and/or to the other particular value. Similarly, when values are expressed as approximations, by use of the antecedent "about," it will be understood that the particular value forms another example. All ranges are inclusive and combinable. Further, a reference to values stated in a range includes each and every value within that range.

It is to be appreciated that certain features of the disclosure which are, for clarity, described herein in the context of separate examples, may also be provided in combination in a single example. Conversely, various features of the disclosure that are, for brevity, described in the context of a single example, may also be provided separately or in any subcombination.

The present disclosure describes various milling techniques for forming anisotropically shaped particles that include iron nitride magnetic materials. In some examples, the shape anisotropy of the particles may contribute to increased magnetic anisotropy compared to isotropically shaped particles including the same iron nitride magnetic materials. In some examples, the iron-nitride containing anisotropic particles generated by the various techniques have an aspect ratio of at least 1.4. Anisotropic particles formed by the techniques of this disclosure may be shaped, for example, as needles, flakes, or laminations. The disclosure also describes techniques for joining anisotropically shaped particles to form bulk material, such as a bulk permanent magnet.

In various examples, the disclosure describes techniques for milling iron-containing raw material in the presence of a nitrogen source to generate a powder including anisotropic particles that include iron nitride.

For example, the disclosure describes milling iron-containing raw material in the presence of a nitrogen source for a predetermined period of time, under a predetermined amount of pressure, at a predetermined low temperature, in the presence of a magnetic field, or in the presence of an electric field. In some examples, the milling may be performed, for example, using milling spheres in the bin of a rolling mode, stirring mode, or vibration mode milling apparatus. Iron-containing raw materials also may be milled in the presence of a nitrogen source using elongated bars, alone or in conjunction with other milling media, to form anisotropically shaped particles. For example, iron-containing raw material may be milled in the presence of urea using cylindrical bars housed within a bin of a rolling mode or vibration mode milling apparatus.

In some examples, two or more of the disclosed techniques may be used in combination to form anisotropically shaped particles including iron nitride. For example, and without limitation, an example technique may include milling iron-containing raw material in the presence of a nitrogen source in the presence of an electric field for a predetermined amount of time. As another example, an example technique may include milling iron-containing raw material in the presence of a nitrogen source in the presence of a magnetic field while the contents of a bin of a milling apparatus are under a predetermined amount of pressure. As another example, an example technique may include milling an iron-containing raw material in the presence of a nitrogen source using elongated bars housed in a milling apparatus, while at least the iron-containing raw material is at a predetermined low temperature (e.g., cryo-milling using elongated bars).

Anisotropic particles generated according to techniques of this disclosure may include one or more iron nitride crystals with varying crystal lattice structures or phase domains. FIG. 1 is a conceptual diagram illustrating an example $Fe_{16}N_2$ iron nitride crystal. Throughout this disclosure, the terms $Fe_{16}N_2$, $\alpha''$-$Fe_{16}N_2$, $\alpha''$-$Fe_{16}N_2$ phase, and $\alpha''$-$Fe_{16}N_2$ phase domain, for example, may be used interchangeably to refer to a $\alpha''$-$Fe_{16}N_2$ phase domain within a material. FIG. 1 shows eight (8) iron unit cells in a strained state with nitrogen atoms implanted in interstitial spaces between iron atoms to form the $Fe_{16}N_2$ iron nitride unit cell. As shown in FIG. 1, in the $\alpha''$-$Fe_{16}N_2$ phase, the N atoms are aligned along the (002) (iron) crystal planes. The iron nitride unit cell is distorted such that the length of the unit cell along the <001> axis is approximately 6.28 angstroms (Å) while the length of the unit cell along the <010> and <100> axes is approximately 5.72 Å. The $\alpha''$-$Fe_{16}N_2$ unit cell may be referred to as a body-centered tetragonal (bct) unit cell when in the strained state. When the $\alpha''$-$Fe_{16}N_2$ unit cell is in the strained state, the <001> axis may be referred to as the c-axis of the unit cell. The c-axis may be the magnetic easy axis of the $\alpha''$-$Fe_{16}N_2$ unit cell. In other words, $\alpha''$-$Fe_{16}N_2$ crystals exhibit magnetic anisotropy.

$\alpha''$-$Fe_{16}N_2$ has high saturation magnetization and magnetic anisotropy constant. The high saturation magnetization and magnetic anisotropy constants result in a magnetic energy product that may be higher than rare earth magnets. For example, experimental evidence gathered from thin film $\alpha''$-$Fe_{16}N_2$ permanent magnets suggests that bulk $Fe_{16}N_2$ permanent magnets may have desirable magnetic properties, including an energy product of as high as about 134 MegaGauss*Oerstads (MGOe), which is about two times the energy product of NdFeB (which has an energy product of about 60 MGOe). Additionally, iron and nitrogen are abundant elements, and thus are relatively inexpensive and easy to procure.

In some examples, an anisotropically shaped particle generated according to techniques disclosed herein may have at least one $Fe_{16}N_2$ iron nitride crystal. In some examples, such an anisotropic particle may include a plurality of iron nitride crystals, at least some (or all) of which $Fe_{16}N_2$ crystals. As described above, anisotropic particles including $Fe_{16}N_2$ may have enhanced magnetic properties, including, for example, at least one of enhanced coercivity, magnetization, magnetic orientation, or energy product, as compared to isotropically shaped particles including $Fe_{16}N_2$. Thus, for example, materials formed using anisotropic particles including $Fe_{16}N_2$ may be promising candidates for permanent magnet applications.

Figure 25:
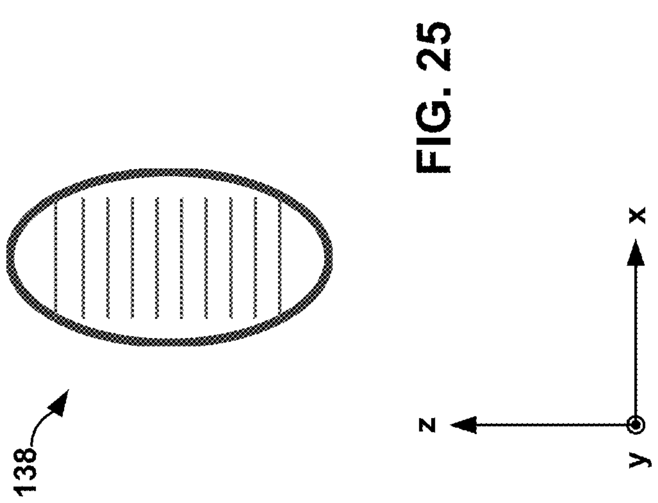
FIG. 25 is a conceptual diagram of an anisotropic particle including at least one $Fe_{16}N_2$ phase domain.

Although not wishing to be bound by theory, three types of anisotropy may contribute to the magnetic anisotropy energy or magnetic anisotropy field of $Fe_{16}N_2$. These three types of anisotropy include magnetocrystalline anisotropy, shape anisotropy, and strain anisotropy. As described above, magnetocrystalline anisotropy may be related to the distortion of the bcc iron crystalline lattice into the bct iron-nitride crystalline lattice shown in FIG. 1. Shape anisotropy may be related to the shape of the particle including at least one $Fe_{16}N_2$ iron nitride phase domain. For example, as shown in FIG. 25, an anisotropic particle 138 including at least one $Fe_{16}N_2$ phase domain may define a longest dimension (substantially parallel to the z-axis of FIG. 25, where orthogonal x-y-z axes are shown for ease of description only). Anisotropic particle 138 also may define a shortest dimension (e.g., substantially parallel to the x-axis or y-axis of FIG. 7). The shortest dimension may be measured in a direction orthogonal to the longest axis of anisotropic particle 138.

Strain anisotropy may be related to strain exerted on the $\alpha''$-$Fe_{16}N_2$ or other iron-based magnetic materials. In some examples, anisotropic particles including at least one $Fe_{16}N_2$ phase domain are disposed or embedded within a matrix that includes grains of iron or other types of iron nitride (e.g., $Fe_4N$). The anisotropic particles including at least one $Fe_{16}N_2$ phase domain may possess a different coefficient of thermal expansion than the grains of iron or other types of iron nitride. This difference can introduce strain into the anisotropic particles including at least one $Fe_{16}N_2$ phase domain due to differential dimensional changes in the particles and the grains of iron or other types of iron nitride during thermal processing. Alternatively or additionally, the material or workpiece may be subjected to mechanical strain or strain due to exposure to an applied magnetic during processing to form anisotropic particles including at least one $Fe_{16}N_2$ phase domain, at least some of which strain may remain in the material or workpiece after processing. Annealing may result in redistribution of the internal stress and local microstructure of the sample in order to reduce the magnetoelastic energy in the stressed state. The magnetic domain structure under strain anisotropy depends on the magnetoelastic energy, magnetostatic energy, and exchange energy.

Figure 26:
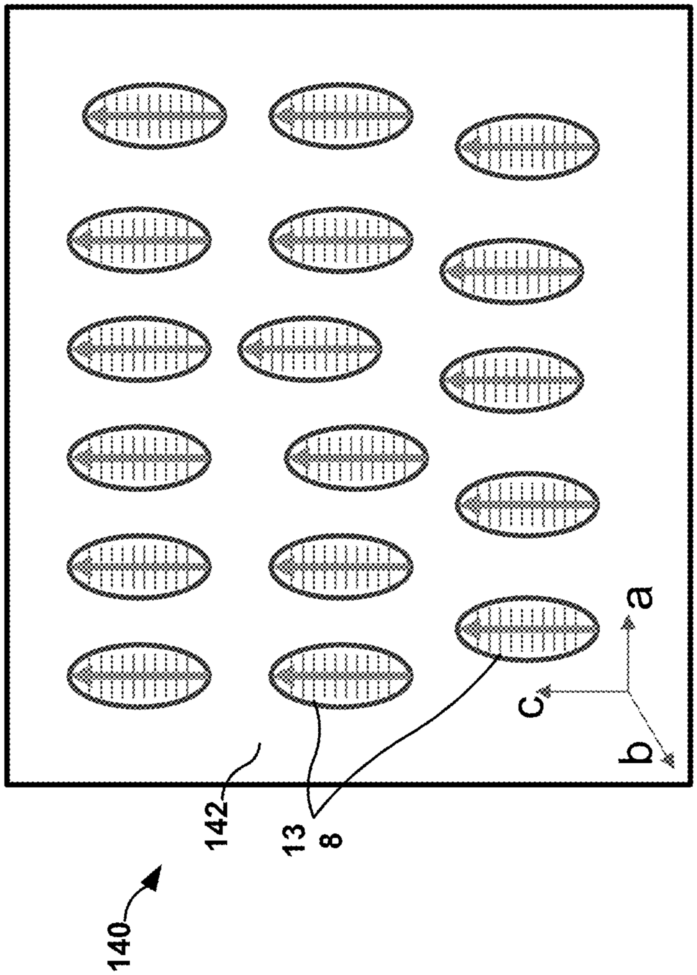
FIG. 26 is a conceptual diagram illustrating an example workpiece that includes a plurality of anisotropic particles including at least one $Fe_{16}N_2$ phase domain in a matrix of other material.

FIG. 26 is a conceptual diagram illustrating an example workpiece 140 that includes a plurality of anisotropic particles 138 including at least one $Fe_{16}N_2$ phase domain in a matrix 142 of other material. As shown in FIG. 26, each of the anisotropic particles 138 defines an anisotropic shape. Further, the magnetic easy axis of each respective anisotropic particle of the anisotropic particles 138 is substantially parallel to (e.g., parallel to or nearly parallel to) the respective longest dimension of the respective anisotropic particle. In some examples, the magnetic easy axis of each respective anisotropic particle may be substantially parallel (e.g., parallel to or nearly parallel to) the other respective magnetic easy axes (and, thus, substantially parallel (e.g., parallel to or nearly parallel to) the other respective longest dimensions). In some examples, this may be accomplished by the technique for aligning and joining a plurality of anisotripically shaped particles, described below in FIG. 12. In this way, workpiece 140 may possess structural characteristics that result in magnetocrystalline anisotropy, shape anisotropy, and strain anisotropy all contributing to the anisotropy field of workpiece 140.

Figure 27:
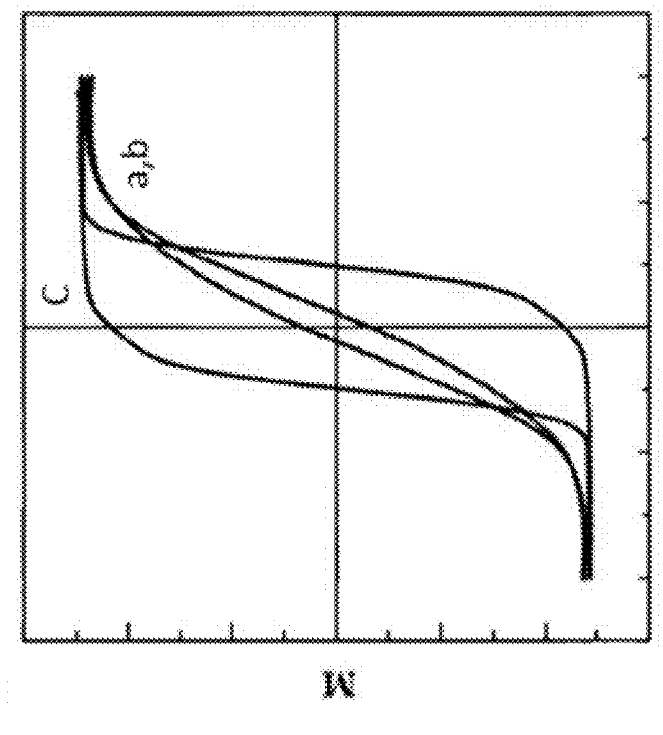
FIG. 27 is a diagram illustrating example hysteresis curves for the workpiece shown in FIG. 26.

FIG. 27 is a diagram illustrating example hysteresis curves for workpiece 140. The hysteresis curves shown in FIG. 27 illustrate that workpiece 140 possesses magnetic anisotropy, as the coercivity (the x-axis intercepts) of workpiece 140 when the magnetic field is applied parallel to the c-axis direction of FIG. 26 is different than the coercivity (the x-axis intercepts) of workpiece 140 when the magnetic field is applied parallel to the a-axis and b-axis directions of FIG. 26.

In connection with various milling techniques described herein, any one or more of a number of forms of iron-containing raw material may be milled in a milling apparatus. Iron-containing raw material may include any material containing iron, including atomic iron, iron oxide, iron chloride, or the like. For example, iron-containing raw material may include iron powder, bulk iron, $FeCl_3$, $Fe_2O_3$, or $Fe_3O_4$. In some examples, iron-containing raw material may include substantially pure iron (e.g., iron with less than about 10 atomic percent (at. %) dopants or impurities) in bulk or powder form. The dopants or impurities may include, for example, oxygen or iron oxide. Iron-containing raw material may be provided in any suitable form, such as a powder or relatively small particles. In some examples, an average size of particles in iron containing raw material may be between about 50 nanometers (nm) and about 5 micrometers (μm). After milling the iron-containing raw material according to any of the techniques described by this disclosure, a generated powder may include particles that have, on average, dimensions ranging from between about 5 nm and about 50 nm in length.

The described iron-containing raw material may be milled in the presence of one or more sources of nitrogen, in connection with the various milling techniques described in this disclosure. Nitrogen sources may take a number of forms, such as a solid, liquid, or gas source of nitrogen. Moreover, the nitrogen sources described herein may serve as a nitrogen donor for the forming of powders that include particles including iron nitride. For example, iron-containing raw material may be nitridized according to techniques of this disclosure using, as a nitrogen source, ammonia, ammonium nitrate ($NH_4NO_3$), an amide-containing material and/or a hydrazine-containing material. Amides include a C—N—H bond, while hydrazine includes an N—N bond. For example, amide-containing materials may include an amide, liquid amide, a solution containing an amide, carbamide ($(NH_2)_2CO$, also referred to as urea), methanamide, benzamide, or acetamide, although any amide may be used. Example hydrazine-containing materials may include hydrazine, or a solution containing hydrazine.

In some examples, amides may be derived from carboxylic acids by replacing the hydroxyl group of a carboxylic acid with an amine group. Amides of this type may be referred to as acid amides. An example reaction sequence for forming an acid amide from a carboxylic acid, nitriding iron, and regenerating the acid amide from the hydrocarbon remaining after nitriding the iron is described in International Application No. PCT/US2014/043902, the entire contents of which are incorporated herein by reference.

Figure 2:
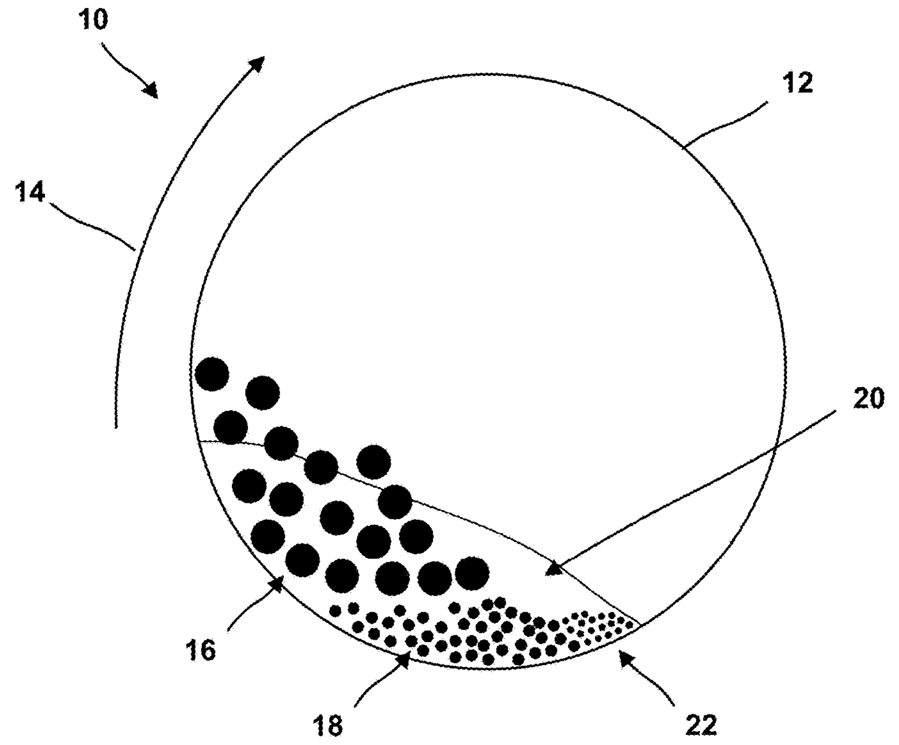
FIG. 2 is a conceptual diagram illustrating an example milling apparatus for milling an iron-containing raw material with a nitrogen source to form anisotropic particles including iron nitride.
Figure 4:
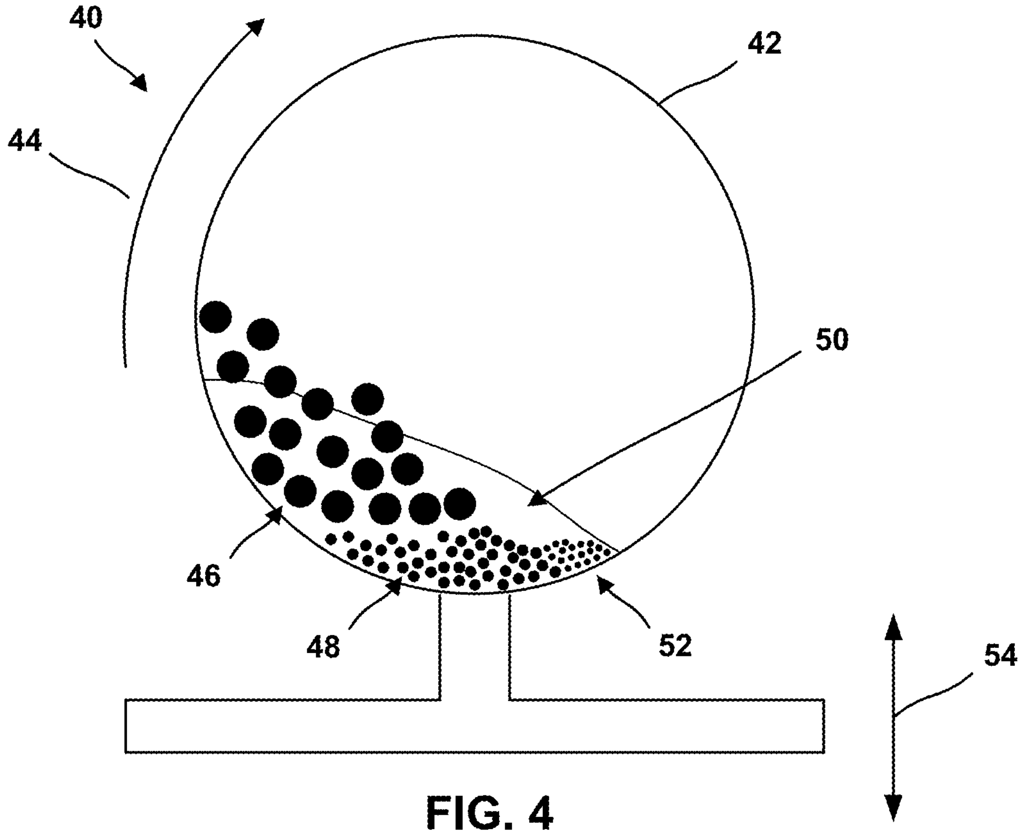
FIG. 4 is a conceptual diagram illustrating another example milling apparatus for milling and nitriding an iron-containing raw material to form anisotropic particles including iron nitride.

In addition, in some example techniques of this disclosure, a catalyst may be introduced to the bin of a milling apparatus to assist the formation of anisotropic particles including iron nitride. The catalyst (such as catalyst 22 or 52, shown in FIGS. 2 and 4, respectively) may include, for example, cobalt (Co) particles and/or nickel (Ni) particles. The catalyst catalyzes the nitriding of the iron-containing raw material (such as iron containing raw material 18 or 48, as shown in FIGS. 2 and 4, respectively). One possible conceptualized reaction pathway for nitriding iron using a Co catalyst is shown in Reactions 1-3, below. A similar reaction pathway may be followed when using Ni as the catalyst.

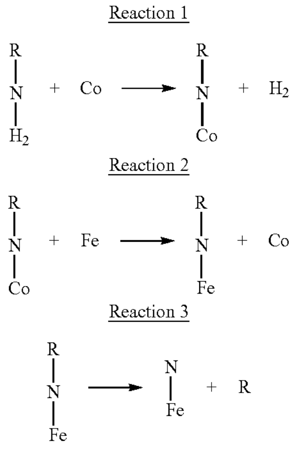

Hence, by mixing sufficient amide and catalyst, iron-containing raw material may be converted to iron nitride containing material according to the techniques described in this disclosure. For example, such a catalyst may be utilized when milling iron-containing raw material in the presence of a nitrogen source at a predetermined low temperature, to assist the formation of anisotropic particles including iron nitride.

FIG. 2 is a conceptual diagram illustrating an example milling apparatus 10 for milling an iron-containing raw material with a nitrogen source to form anisotropic particles including iron nitride. Milling apparatus 10 may be operated in a rolling mode, in which a bin 12 of milling apparatus 10 rotates about a horizontal axis of bin 12, as indicated by arrow 14. As bin 12 rotates, milling media 16 (such as milling spheres, milling bars, or the like) move within bin 12 and, over time, crush or wear an iron-containing raw material 18. In addition to iron-containing raw material 18 and milling media 16, bin 12 encloses at least a nitrogen source 20 and an optional catalyst 22. While FIG. 2 illustrates certain forms of iron-containing raw material 18, nitrogen source 20, and catalyst 22 within bin 12, iron-containing raw material 18, nitrogen source 20, and catalyst 22 may include any one or more of the forms of iron-containing raw material, nitrogen sources, or catalysts described in greater detail throughout this disclosure.

In the example illustrated in FIG. 2, milling media 16 may include a sufficiently hard material that, when contacting iron-containing raw material 18 with sufficient force, will wear iron-containing raw material 18 and cause particles of iron-containing raw material 18 to, on average, have a smaller size. In some examples, milling media 16 may be formed of steel, stainless steel, or the like. In some examples, the material from which milling media 16 are formed may not chemically react with iron-containing raw material 18 and/or nitrogen source 20. In some examples, milling media 16, such as milling spheres, may have an average diameter between about 5 millimeters (mm) and about 20 mm.

In operation, bin 12 of rolling mode milling apparatus 10 may be rotated at a rate sufficient to cause mixing of the components in bin 12 (e.g., milling media 16, iron-containing raw material 18, nitrogen source 20, and, in some examples, catalyst 22) and cause milling media 16 to mill iron-containing raw material 18. In some examples, bin 12 may be rotated at a rotational speed of between about 500 revolutions per minute (rpm) to about 2000 rpm, such as between about 600 rpm and about 650 rpm, about 600 rpm, or about 650 rpm. Further, to facilitate milling of iron-containing raw material 18, in some examples, the mass ratio of the total mass of milling media 16 to the total mass of iron-containing raw material 18 may be between about 1:1 to about 50:1, for example, about 20:1.

Figure 3:
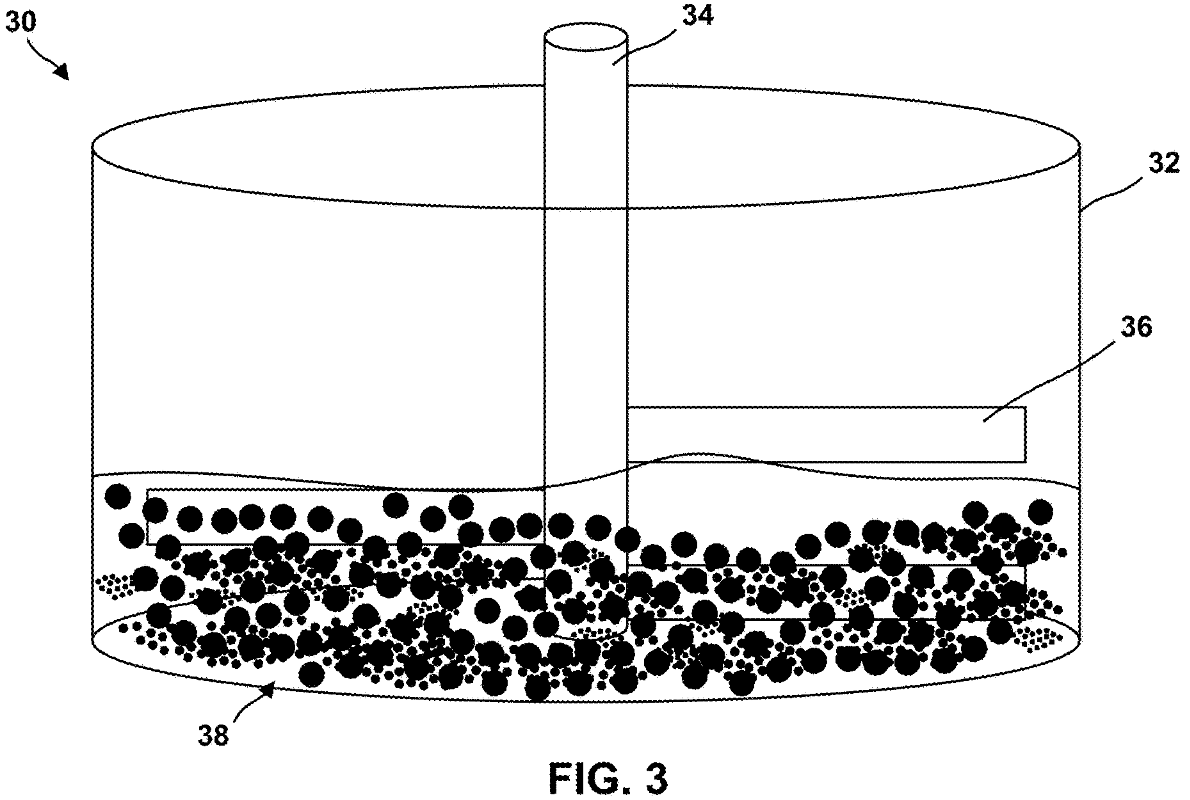
FIG. 3 is a conceptual diagram illustrating another example milling apparatus for milling an iron-containing raw material with a nitrogen source to form anisotropic particles including iron nitride.

In other examples, the milling process may be performed using a different type of milling apparatus. FIG. 3 is a conceptual diagram illustrating another example milling apparatus for milling an iron-containing raw material with a nitrogen source to form anisotropic particles including iron nitride. The milling apparatus illustrated in FIG. 3 may be referred to as a stirring mode milling apparatus 30. Stirring mode milling apparatus includes a bin 32 and a shaft 34. Mounted to shaft 34 is a plurality of paddles 36, which stir contents of bin 32 as shaft 34 rotates. Contained in bin 32 is a mixture 38 of milling media, iron-containing raw material, a nitrogen source, and, optionally, a catalyst. The milling media, iron-containing raw material, nitrogen source, and optional catalyst may be the same as or substantially similar to milling media 16, iron-containing raw material 18, nitrogen source 20, and catalyst 22 described with reference to FIG. 2.

Stirring mode milling apparatus 30 may be used to mill iron-containing raw material in the presence of a nitrogen source to form a plurality of anisotropic particles in a manner similar to rolling mode milling apparatus 10. For example, shaft 34 may be rotated at a rate between about 500 rpm and about 2,000 rpm, such as between about 600 rpm and about 650 rpm, about 600 rpm, or about 650 rpm. Further, to facilitate milling of the iron-containing raw material, in some examples, the mass ratio of the milling media to the iron-containing raw material may be about 20:1.

FIG. 4 is a conceptual diagram illustrating another example milling apparatus for milling and nitriding an iron-containing raw material to form anisotropic particles including iron nitride. The milling apparatus illustrated in FIG. 4 may be referred to as a vibration mode milling apparatus 40. As shown in FIG. 4, vibration mode milling apparatus 40 may utilize both rotation of bin 42 (indicated by arrow 44) about an axis (such as a horizontal axis of bin 42) and vertical vibrating motion of bin 42 (indicated by arrow 54) to mill the iron-containing raw material 48 using milling media 46 (such as milling spheres, milling bars, or the like). As shown in FIG. 4, bin 42 contains a mixture of milling media 46, iron-containing raw material 48, nitrogen source 50, and optional catalyst 52. Milling media 46, iron-containing raw material 48, nitrogen source 50, and optional catalyst 52 may be the same as or substantially similar to milling media 16, iron-containing raw material 18, nitrogen source 20, and catalyst 22 described with reference to FIG. 2.

Vibration mode milling apparatus 40 may be used to nitridize the iron-containing raw material 48 and form anisotropically shaped particles in a manner similar to milling apparatus 10 illustrated in FIG. 2. For example, bin 42 may be rotated at a rate between about 500 rpm and about 2,000 rpm, such as between about 600 rpm and about 650 rpm, about 600 rpm, or about 650 rpm. Further, to facilitate milling of the iron-containing raw material, in some examples, the mass ratio of the milling media to the iron-containing raw material may be about 20:1.

Figure 5:
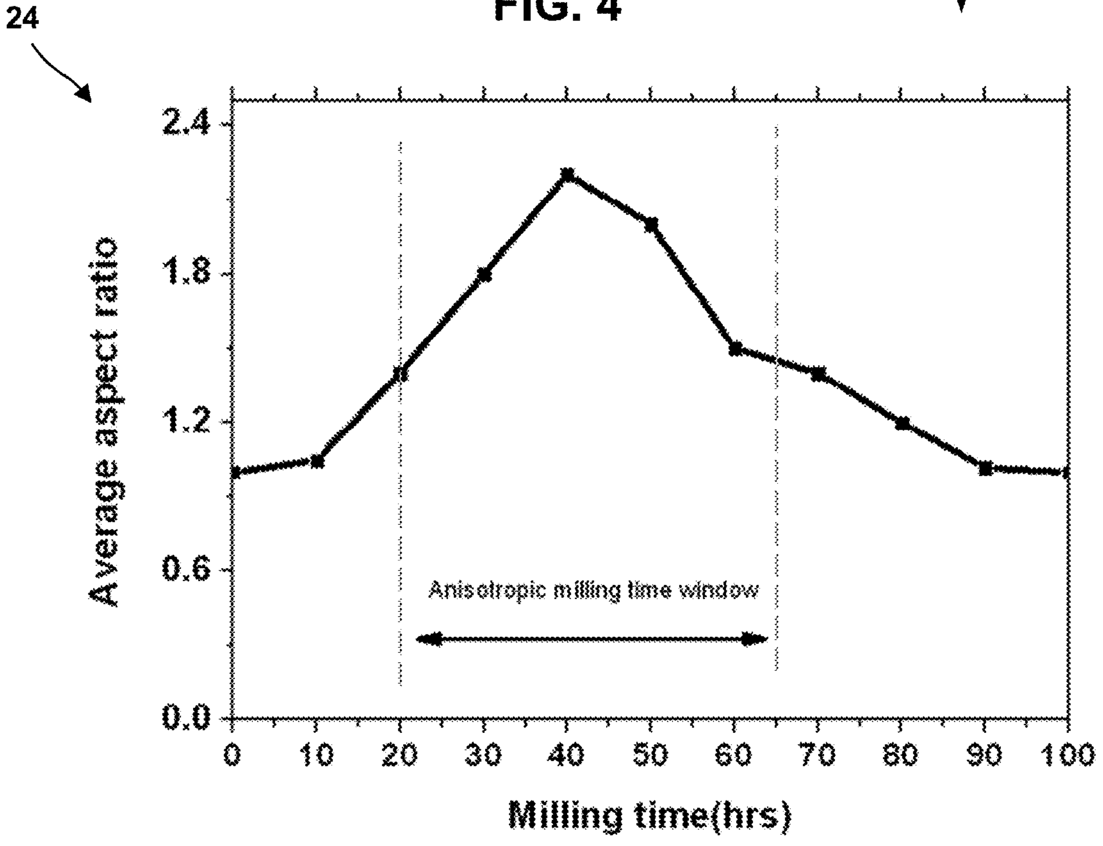
FIG. 5 is a chart illustrating a relationship between an average aspect ratio of anisotropic particles and milling time.

FIG. 5 is a chart illustrating a relationship between an average aspect ratio of anisotropic particles and milling time. The data points in the chart of FIG. 5 were derived from samples prepared by milling pure iron pieces in the presence of ammonium nitrate using steel milling spheres. In this example, the pure iron pieces and ammonium nitrate were introduced into a bin or jar of a Retsch® Planetary Ball Mill PM 100 (Retsch®, Haan, Germany) (hereinafter, "PM 100 planetary ball milling apparatus") in an about 1:1 mass ratio. Prior to milling, the pure iron pieces had, on average, at least one dimension measuring at least one millimeter in length. The mass ratio between the pure iron pieces and the steel milling spheres within the jar was about 1:5. The pure iron pieces were milled in the presence of the ammonium nitrate as the jar rotated about its longitudinal axis at a speed of about 650 rotations per minute (rpm) for a period of 100 hours. While the jar rotated about its longitudinal axis, the PM 100 planetary ball milling apparatus also rotated the jar itself in a planetary rotation about a vertical axis. The milling technique was performed at ambient temperature (about 23° C.) and pressure.

A chart 24 of FIG. 5 shows the average aspect ratio of particles sampled at different times during the 100-hour test period. As shown, milling over the time window of about 20 hours to about 65 hours produced anisotropic particles having an aspect ratio of at least 1.4, and in some cases, an aspect ratio of at least 2.2.

As used herein, aspect ratio is defined as the ratio of the length of the longest dimension of an anisotropic particle to the length of the shortest dimension of the anisotropic particle, where the longest dimension is substantially orthogonal (e.g., orthogonal or nearly orthogonal) to the shortest dimension. For example, an absolute longest dimension may be measured, and the shortest dimension of the particle in a direction orthogonal to the direction of the absolute longest dimension may be used for the shortest dimension in the determination of the aspect ratio of the particle. Thus, for example, a particle with a length of 14 nanometers (nm) in the z direction, 12 nm in the x direction, and 10 nm in the y direction, has an aspect ratio of 1.4 (14 nm [longest dimension of the particle]:10 nm [shortest dimension of the particle in a direction substantially orthogonal to the longest dimension of the particle]). In general, milling iron-containing raw material in the presence of a nitrogen source according to techniques disclosed herein may generate a powder including a plurality of anisotropic particles that include iron nitride. At least some of the generated anisotropic particles may have an aspect ratio of at least 1.4.

The formation of shape anisotropy in particles including magnetic material, using milling techniques disclosed herein, may enhance magnetic properties and magnetic anisotropy of the particles, e.g., compared to substantially isotropic particles including the same material. For example, anisotropic particles including iron nitride, such as anisotropic particles that have an aspect ratio of at least 1.4, may possess at least one of improved coercivity, magnetization, magnetic orientation, or energy product compared to isotropically shaped particles (e.g., spheres) including the same composition of iron nitride. Some iron nitride phases, such as $Fe_{16}N_2$, have magnetocrystalline anisotropy due to the atomic structure of the iron nitride crystal. Phases such as $Fe_{16}N_2$ have magnetically easy axes, such that magnetization is more energetically favorable or stable along easy axes of the crystal. In some examples, an iron nitride crystal may be oriented within an anisotropic particle such that the easy axis is substantially aligned with the longest dimension of the particle. In some of these examples, an anisotropic particle including a $Fe_{16}N_2$ phase may more readily align its magnetic moment along the longest dimension of the particle, which may substantially align with one or more easy axes of iron nitride crystal(s) in the particle. This may contribute to enhanced magnetic anisotropy and/or magnetic properties compared to isotropically shaped particles including iron nitride.

Further, production of anisotropic particles including iron nitride, according to the techniques of this disclosure, may lead to cost effective mass production of iron nitride-containing material and bulk permanent magnets including iron nitride (e.g., $Fe_{16}N_2$). Moreover, anisotropic particles including iron nitride may, in some examples, be consolidated or joined with other materials (including other magnetic materials) to obtain a higher energy product.

Anisotropically shaped particles including iron nitride may be formed by various milling techniques according to this disclosure. For example, iron-containing raw material may be milled by milling spheres or bars in the presence of a nitrogen source to form anisotropic particles including iron nitride (e.g., $Fe_{16}N_2$). As stated, in some examples, two or more disclosed milling techniques may be combined to form anisotropic particles including iron nitride. In some examples, a technique for forming such anisotropic particles may include milling iron-containing raw material 18 in the presence of nitrogen source 20 for a predetermined period of time. This technique may be implemented using any suitable milling apparatus, such as rolling mode milling apparatus 10, stirring mode milling apparatus 30, or vibration mode milling apparatus 40, described herein with respect to FIGS. 2, 3 and 4, or milling apparatuses 60, 74, 90, 100, or 120, described in greater detail below with respect to FIGS. 6, 7A, 8, 9, and 10.

For instance, iron-containing raw material 18 and nitrogen source 20 (FIG. 2) may be milled (e.g., ground into, on average, smaller-sized particles) in bin 12 of rolling mode milling apparatus 10 by milling media 16 for a period of time of between about 20 hours and about 65 hours. For example, the chart shown in FIG. 5 illustrates that particles milled for between about 20 hours and about 65 hours may have an anisotropic shape corresponding to an average aspect ratio ranging from about 1.4 to about 2.2. In some examples, milling for a predetermined time may include milling iron-containing raw material 18 and nitrogen source 20 for between about 30 hours and about 50 hours.

Figure 6:
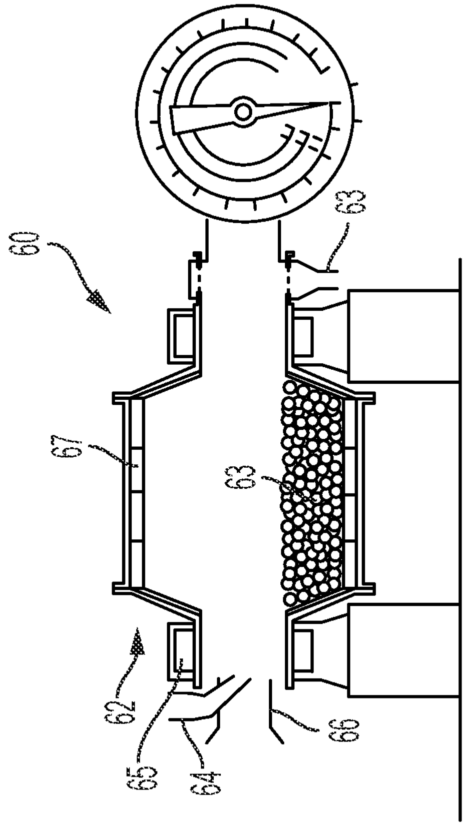
FIG. 6 is a conceptual diagram illustrating an example high pressure ball milling apparatus.

As another example, a technique of this disclosure may include milling an iron-containing raw material in the presence of a nitrogen source under a predetermined amount of pressure to form anisotropic particles including iron nitride. FIG. 6 is a conceptual diagram illustrating an example high pressure ball milling apparatus. In some examples, the high pressure ball milling apparatus 60 shown in FIG. 6 may include features similar to or the same as the rolling mode milling apparatus 10 of FIG. 2. High pressure ball milling apparatus 60 may include, in some examples, a bin 62, milling media 63 (such as milling spheres, as shown, or elongated bars), a raw material input 64, bearings 65, a gas input 66, liner plates 67, and a powder output 68, among other features. In the example shown in FIG. 6, an input gas, such as nitrogen, argon, air, or ammonia, may be introduced into bin 62 via gas input 66 to increase pressure within bin 62. In some examples, the input gas introduced via gas input 66 may be a source of nitrogen that donates nitrogen to iron-containing raw material, such as nitrogen source 20 described with respect to FIG. 2.

Though a high pressure ball milling apparatus 60 is shown in FIG. 6, this technique may be implemented using, for example, any one of rolling mode milling apparatus 10, stirring mode milling apparatus 30, or vibration mode milling apparatus 40, described with respect to FIGS. 2, 3 and 4, or milling apparatuses 74, 90, 100, or 120, described in greater detail with respect to FIGS. 7A, 8, 9, and 10. Further, the milling media, iron-containing raw material, nitrogen source, and optional catalyst used for this technique may be the same as or substantially similar to milling media 16, iron-containing raw material 18, nitrogen source 20, and catalyst 22 described with reference to FIG. 1.

In some examples, during milling, the pressure within bin 62 of milling apparatus 60 may be increased to between about 0.1 GPa and about 20 GPa to facilitate formation of anisotropically shaped particles that include iron nitride. For example, the pressure within bin 62 may be increased to between about 0.1 GPa and about 1 GPa during milling. In some examples, milling the contents of bin 62 under a predetermined pressure may aid in directing the contents toward an inner surface of bin 62 (e.g., toward liner plates 26 of bin 62) during milling, which may facilitate formation of anisotropically shaped particles. For example, by milling the contents of milling apparatus 60 under a predetermined pressure, a powder including a plurality of anisotropic particles may be formed that include a $Fe_{16}N_2$ phase constitution. In some examples, at least some of the anisotropic particles have an aspect ratio of at least 1.4.

In the example high pressure ball milling apparatus 60, liner plates 67 may be attached to or form an inner surface of bin 62. Liner plates 67 may be composed of, for example, hard metal, such as steel, nickel, chromium, or the like. Further, as shown in FIG. 6, bin 62 may be generally shaped like a barrel. In some examples, a middle, barrel-shaped portion of bin 62 may have a wider circumference compared to opposing first and second ends of the barrel-shaped portion, which may taper and thereby narrow in circumference, forming narrower barrel-shaped portions of bin 62 at opposing ends of the wider barrel portion of bin 62. In some examples, raw material input 64 and gas input 66 feed into one of the narrower openings of bin 62, while powder output 68 exits the other narrower opening of bin 62. Bearings 65 may surround each of the openings at the narrower first and second ends of bin 62, as shown in FIG. 6, to facilitate rotation of bin 62.

For example, iron-containing powder may be introduced into raw material input 64, and ammonia gas may be input into gas input 66 and bin 62 at a pressure of between about 0.1 GPa and about 20 GPa. The contents of bin 62 may be rotated at a speed of between about 500 rpm and about 2,000 rpm within bin 62 and milled by milling media 63 (e.g., milling spheres), thereby generating a powder including anisotropic particles including iron nitride that exits high pressure ball milling apparatus 60 via powder output 68. In some examples, a temperature within the bin of the milling apparatus used for this technique (such as milling apparatus 60) may be increased, in combination with the introduction of a suitable pressurized gas, to achieve a desired increased pressure between about 0.1 GPa and about 20 GPa within the bin 62.

In some examples, a temperature at which components are milled may be controlled to facilitate formation of anisotropic particles including iron nitride. For example, a technique according to this disclosure may include milling an iron-containing raw material at a predetermined low temperature in the presence of a nitrogen source using milling media. For example, milling the contents of a milling apparatus at a temperature between about 77 Kelvin (K) (about −196.15° C.) and ambient temperature (about 23° C.) may facilitate formation of anisotropically shaped particles that include iron nitride. In some examples, at least the iron-containing raw material, or even all contents of the milling apparatus, may be cooled to a temperature between about −196.15° C. and about ambient temperature by introducing liquid nitrogen to the bin of a milling apparatus, which may cool at least the iron-containing raw material to a temperature of, for example, about −196.15° C. This technique may be implemented using any suitable milling apparatus, such as rolling mode milling apparatus 10, stirring mode milling apparatus 30, or vibration mode milling apparatus 40, described herein with respect to FIGS. 2, 3 and 4, or milling apparatuses 60, 74, 90, 100, or 120, described herein with respect to FIGS. 6, 7A, 8, 9, and 10. Further, the milling media, iron-containing raw material, nitrogen source, and optional catalyst utilized for this technique may be the same as or substantially similar to milling media 16, iron-containing raw material 18, nitrogen source 20, and optional catalyst 22 described with reference to FIG. 2. Milling at a predetermined low temperature may sometimes be referred to herein as cryo-ball milling.

Figure 7A:
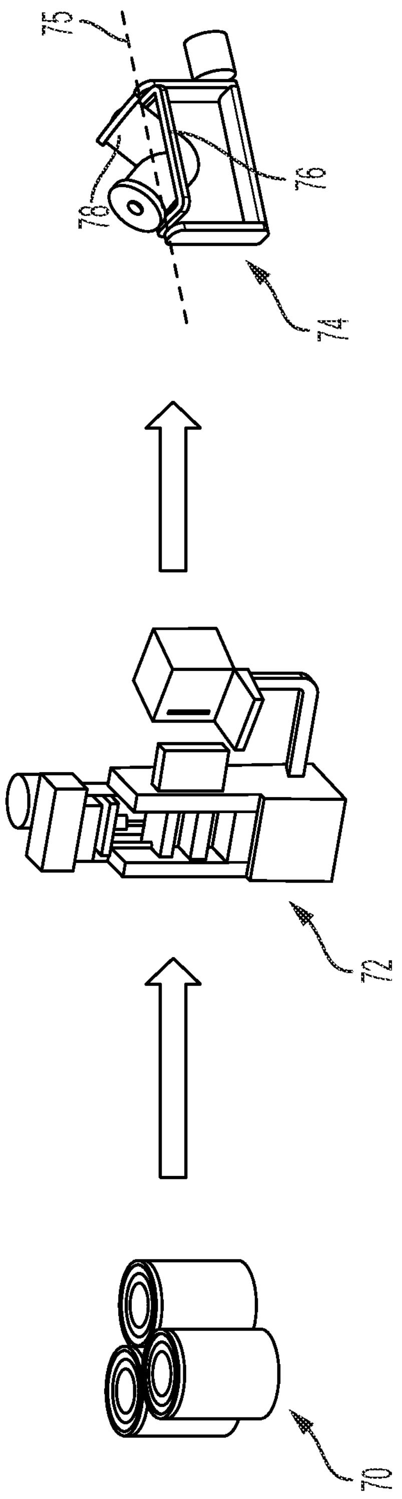
FIG. 7A is a conceptual diagram illustrating an example cryo-ball milling technique according to this disclosure.

FIG. 7A illustrates a conceptual diagram of an example cryo-ball milling technique. For example, an iron precursor 70 may be milled with Al, Ca, or Na in an example rough milling apparatus 72. In some examples, iron precursor 70 may include at least one of Fe, $Fe_2O_3$, $Fe_3O_4$, or FeCl. By rough milling in this manner, the at least one of Al, Ca, or Na may react with oxygen or chlorine present in iron precursor 70, if any. The oxidized at least one of Ca, Al, or Na then may be removed from the mixture using at least one of a deposition technique, an evaporation technique, or an acid cleaning technique. In this way, a more pure iron-containing raw material may be formed by reacting the oxygen or chlorine with the at least one of Ca, Al, or Na.

The rough-milled iron-containing raw material may then be fine milled in a cryo-ball milling apparatus 74. As shown in FIG. 7A, cryo-ball milling apparatus 74 may be a type of rolling mode milling apparatus. An angular bin 78 may be mechanically coupled to a frame 76 that rotates about a substantially horizontal axis 75. Milling media within bin 78 may mill the iron-containing raw material in the presence of a nitrogen source (e.g., urea) at a temperature between about 77 K and ambient temperature (about 23° C.). In some examples, liquid nitrogen may be introduced into bin 78 so that the iron-containing raw material (along with other contents) is cooled at a temperature between about 77 K and ambient temperature (e.g., about 77 K) during milling.

Figure 7B:
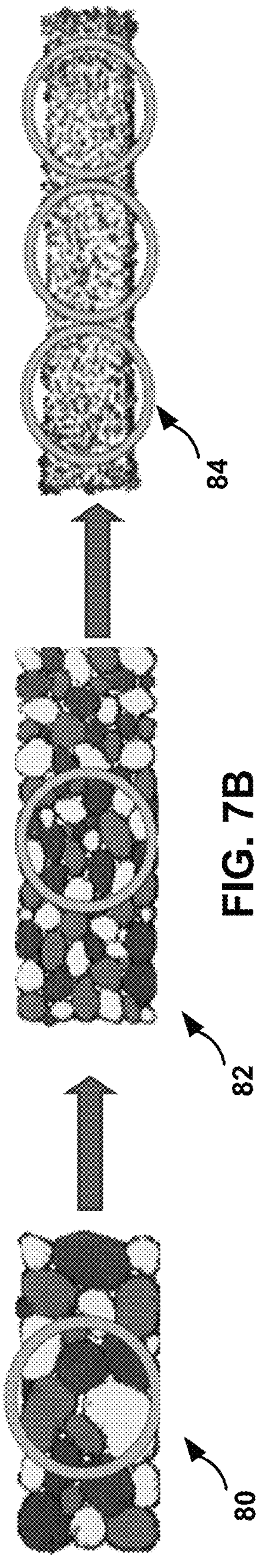
FIG. 7B is a conceptual diagram illustrating example sizes of particles at different stages of the cryo-ball milling technique shown in FIG. 7A.

FIG. 7B illustrates a conceptual diagram of the size of particles at different stages of the cryo-ball milling technique shown in FIG. 7A. For example, a mixture 80 may include a powder containing iron precursor particles (such as iron precursor 70). Particles of iron precursor 70 may have an average size of between about 500 nanometers (nm) and about 500 micrometers (μm), for example. After a rough milling of the iron precursor particles, for example with one of Al, Ca, or Na, a mixture 82 may include iron-containing raw material (such as iron containing raw material 20) having a smaller average size, for example between about 50 nm and about 5 μm. Further, after milling the iron-containing precursor with, for example, a nitrogen source and catalyst at a predetermined low temperature, mixture 84 is formed that includes particles having a size smaller than the particles of mixture 82. For example, particles may have dimensions ranging from between about 5 nm and about 50 nm in length. The particles of mixture 84 may include, for example, anisotropic particles including iron nitride that have an aspect ratio of at least about 1.4. In some examples, the iron nitride present in such anisotropic particles may include an $Fe_{16}N_2$ phase constitution.

Figure 8:
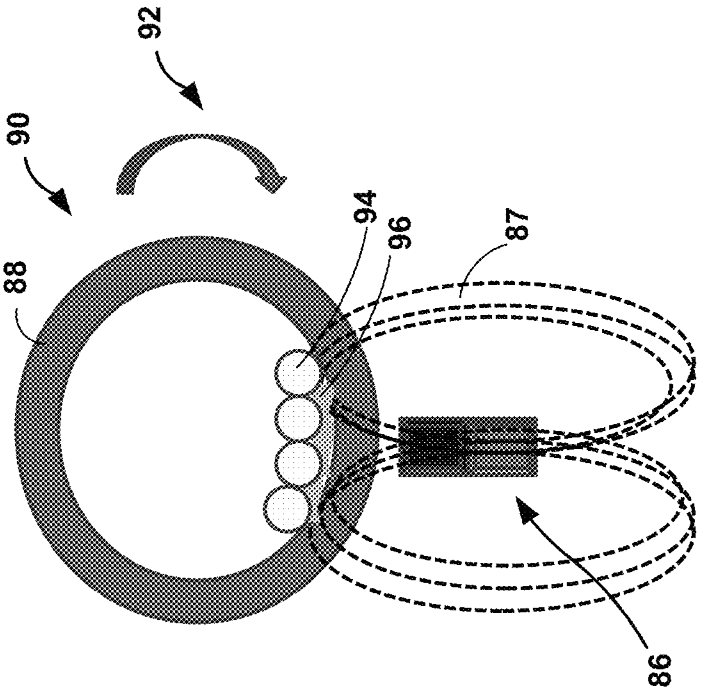
FIG. 8 is a conceptual diagram illustrating an example magnetically assisted milling apparatus.

Anisotropic particles including iron nitride also may be formed by milling iron-containing raw material in the presence of a nitrogen source and a magnetic field. FIG. 8 is a conceptual diagram illustrating an example magnetically assisted milling apparatus. As shown in FIG. 8, for example, a magnet 86 (e.g., a permanent magnet or electromagnet) may be placed adjacent to a bin 88 of a rolling mode milling apparatus 90 to generate a magnetic field 87 within, proximate to, or along a dimension of bin 88. Rolling mode milling apparatus 90 may include features that are the same as or similar to rolling mode milling apparatus 10 described with respect to FIG. 2.

In operation, a motor (not shown) that is coupled to bin 88 may cause bin 88 to rotate and/or vibrate to induce milling of the contents of bin 88. Further, one or more sets of bearings (not shown) may be positioned at one or more locations adjacent to bin 88, to facilitate rotation of bin 88 about an axis (e.g., horizontal axis) of bin 88. For example, a set of bearings may be positioned within a support structure of bin 88 and around at least a portion of the circumference of each opposing end of bin 88, such that each bearing may engage at least a portion of an outer circumference of bin 88 on one side, and the support structure and/or a component thereof on an opposing side. In these examples, the set of bearings may rotatably couple bin 88 and a support structure (not shown) for bin 88. An example support structure is described with respect to FIG. 10. In this configuration and other configurations it is contemplated that a bin and support structure are rotatably coupled by the one or more sets of bearings.

When bin 88 rotates in a rolling motion (indicated by arrow 92), magnetic field 87 may substantially maintain (e.g., maintain or nearly maintain) iron-containing raw material 96 in a particular orientation, for at least a portion of the milling time. In such an example, milling media 94 may wear iron-containing raw material 96 in an uneven or anisotropic fashion, such that at least a first surface of iron-containing raw material 96 is worn unevenly in comparison to a second surface (e.g., where the first and second surfaces are substantially orthogonal), instead of being worn in a generally equal or isotropic manner in all dimensions or at all surfaces of iron-containing raw material 96.

For example, iron-containing raw material 96 may align itself such that easy axes of iron crystals within the iron-containing magnetic material (or iron nitride crystals, once the iron-containing raw material is nitridized) are substantially parallel to the direction of the applied magnetic field. In some examples, easy axes of the iron crystals (or iron nitride crystals) are aligned in such a manner at least some (or all) of the time the iron-containing raw material 96 is being milled.

For example, milling media 16 (such as milling spheres) may wear more of a particle of iron-containing raw material 96 from a surface of the particle oriented in an x direction or y direction, and may wear less of a particle of iron-containing raw material 96 in a z direction, such that the length of the particle in the z direction is longer than the length of the particle in an x or y direction. For example, the length of a milled particle in a z direction (which in some examples may be parallel to the <001> crystal axes of iron nitride crystals within the particle) may be about 1.4 times longer than a length of the milled particle in the x or y direction.

This technique may be implemented using any suitable milling apparatus, into or along which a magnetic field is introduced, such as rolling mode milling apparatus 10, stirring mode milling apparatus 30, or vibration mode milling apparatus 40, described herein with respect to FIGS. 2, 3 and 4, or milling apparatuses 60, 74, 100, or 120, described herein with respect to FIGS. 6, 7A, 9, and 10. In some examples, the magnetic field utilized in connection with this technique may have a strength of between about 0.1 tesla (T) and about 10 T. External magnetic field 87 may include a magnetic field generated using an electromagnet with alternating current or direct current. A bin of the selected milling apparatus may rotate at a speed of, for example, between about 50 revolutions per minute (rpm) and 500 rpm. Further, the milling media 94, iron-containing raw material 96, nitrogen source, and an optional catalyst utilized for this technique may be the same as or substantially similar to milling media 16, iron-containing raw material 18, nitrogen source 20, and catalyst 22 described with reference to FIG. 2. In some examples, milling iron-containing raw material in the presence of at least a nitrogen source may generate a powder including a plurality of anisotropic particles include iron nitride (e.g., including a $Fe_{16}N_2$ phase constitution). In some of these examples, the particles also may have an aspect ratio of at least 1.4.

Figure 9:
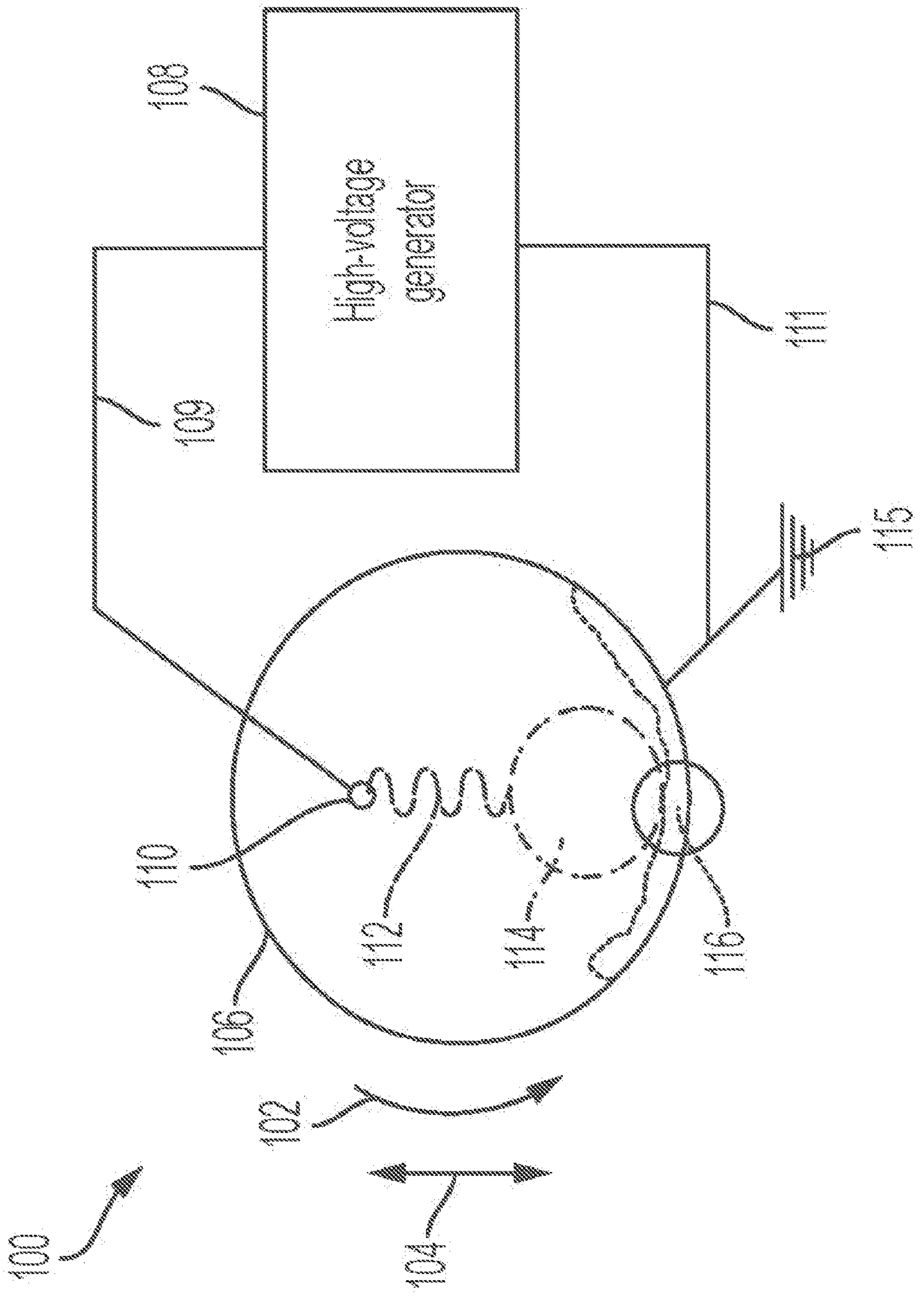
FIG. 9 is a conceptual diagram illustrating an example electro-discharge assisted milling apparatus.

Another example technique for forming anisotropic particles including iron nitride may include utilizing an electric field, alone or in combination with use of a magnetic field or other techniques described herein. FIG. 9 is a conceptual diagram illustrating an example electro-discharge assisted milling apparatus, for use in accordance with this technique. The electro-discharge assisted milling apparatus 100 may be a type of, for example, rolling mode milling apparatus, stirring mode milling apparatus, or vibration mode milling apparatus, as described above. For example, a bin 106 of milling apparatus 100 may rotate in a direction 102 (or in the reverse direction) or vibrate as shown by double-headed direction arrow 104. A motor that is at least mechanically coupled to bin 106 may cause bin 106 to rotate. In addition or alternatively, in some examples, such a motor that is at least mechanically coupled to bin 106 may cause bin 106 to vibrate, to enhance milling of the contents of bin 106. One or more milling media 114, iron-containing raw material 116, nitrogen source, and optional catalyst for this technique may be the same as or substantially similar to milling media 16, iron-containing raw material 18, nitrogen source 20, and catalyst 22 described with reference to FIG. 2.

Electro-discharge assisted milling apparatus 100 may include a generator 108 (e.g., a high-voltage generator) that generates an electric field within a bin 106 of electro-discharge assisted milling apparatus 100. For example, generator 108 may apply a voltage within bin 106 along a first wire 109. First wire 109 may include, in some examples, a flexible wire portion 112 connected to first wire 109 via connector 110 that terminates at a milling medium 114 within bin 106. In some examples, first wire 109 may be disposed in an open space within bin 106. In some examples, electro-discharge assisted milling apparatus 100 may include a single milling medium 114 to which first wire 109 is attached via flexible wire portion 112. In other examples, multiple milling media may be attached to wire 109 via multiple respective flexible wire portions 112 that extend from connector 110 to respective milling media. In some examples, first wire 109 may be substantially rigid or have a substantially rigid coating or cladding sufficient to support movement of one or more milling media and respective flexible wire portions as the components move within bin 106 during rotation of bin 106.

In some examples, as shown at FIG. 9, first wire 109 may be electrically and mechanically coupled to generator 108 at a first end, disposed and/or supported within bin 106, and terminate at milling media 114 (e.g., a milling sphere) at a second end via flexible wire portion 112. A second wire 111 may be electrically and mechanically coupled to generator 108 at a first end and to bin 106 or a component electrically coupled to bin 106 at a second end. Second wire 111 also may be coupled to a ground 115. Accordingly, first wire 109, connector 110, flexible wire portion 112, milling media 114, and second wire 111 may be composed of any suitable electrically conductive material. Thus, for example, generator 108 may generate an electrical potential difference between milling medium 114 and grounded second wire 111, with milling medium 14 being at a different voltage than grounded second wire 111. In some examples, additional milling media not electrically coupled to wire 109 may be included within bin 106 of electrodischarge-assisted milling apparatus 100 to further aid milling.

The voltage emanating from generator 108 may be carried by an alternating current, a direct current, or both. For example, generator 108 may generate a direct current voltage between about 10 volts (V) and about 10,000 V. In other examples, an alternating current generator may generate a current with a frequency up to 10 megahertz (MHz), and an output power of between about 0.1 watts (W) and about 100 W.

A high-voltage generator that is electrically coupled (and in some examples, mechanically coupled) to bin 106 of milling apparatus 100 may include a spark discharge mode and/or a glow discharge mode. For example, generator 108 may generate a spark or glow that emanates from milling media 114 via first wire 109 and connector 110. For example, the spark or glow may be conducted from a higher-potential milling media 114 to a lower potential bin 116 coupled to grounded second wire 111. In some examples, the spark or glow may be electrically conducted through iron-containing raw material 116 to bin 106 and/or an electrically conductive component electrically coupled to bin 106, and ultimately to the lower-potential ground 115, as shown in FIG. 9. Accordingly, an electro-force may be transmitted to iron-containing raw material 116 via a spark or glow. In some examples, electrically polarizable material within iron-containing raw material 116 may cause iron-containing raw material 116 to orient itself in a particular orientation in response to the transmitted spark or glow and/or to align itself with the electric field generated by generator 108 between first wire 109 and second wire 111 (or respective components electrically coupled to first wire 109 or second wire 111). In this way, iron-containing raw material 116 may be milled in an uneven or anisotropic fashion, generating a powder including particles that include iron nitride and have an anisotropic shape, e.g., an aspect ratio of at least 1.4.

Figure 10:
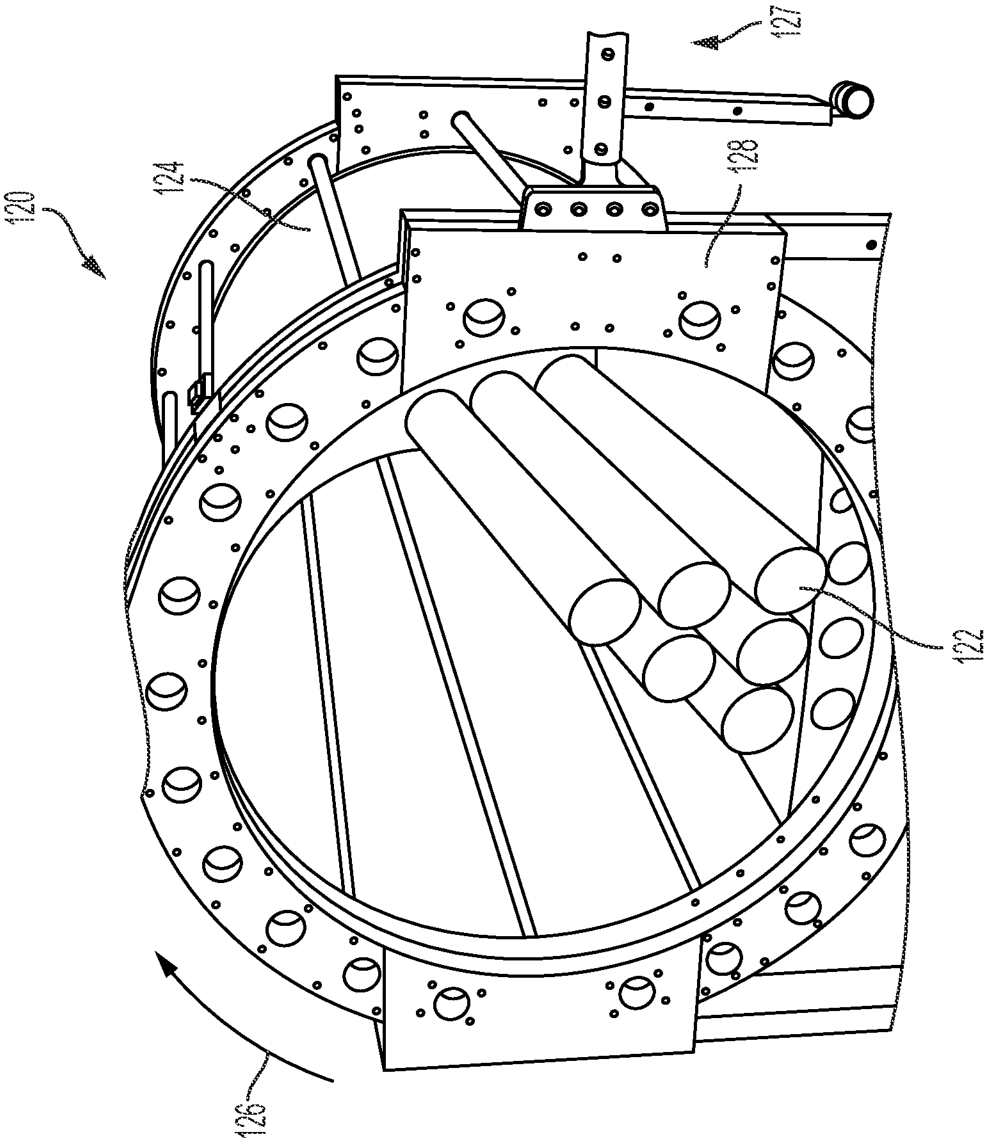
FIG. 10 is a conceptual diagram illustrating an example bar milling apparatus.

In some examples, in addition to or as an alternative to using time, temperature, pressure, a magnetic field, or an electric field to facilitate formation of anisotropic particles, a milling technique may utilize elongated milling media to facilitate formation of anisotropic particles. FIG. 10 is a conceptual diagram illustrating an example bar milling apparatus. As shown in FIG. 10, elongated bars 122 may be housed within a bin 124 of a bar milling apparatus 120. Elongated bars 122 may, for example, be cylindrical in shape, though other suitable shapes may be utilized. In some examples, bin 124 is generally barrel shaped. For example, a horizontal axis of bin 124 may be substantially parallel with the respective horizontal axes of elongated bars 122, when the elongated bars 122 are housed within bin 124. Bar milling apparatus 120 may be a type of, for example, rolling mode milling apparatus or vibration mode milling apparatus, as described with respect to FIGS. 2 and 4.

In some examples, bin 124 of bar milling apparatus 120 may rotate about a horizontal axis (not shown) of bin 124 in a direction 126 (or in the reverse direction), so that elongated bars 122 rotate about their respective horizontal axes and/or the elongated bars 122 roll over one another in bin 124. Before initiating rotation of bin 124, elongated bars 122 may be arranged in any number of suitable manners within bin 124, such as in a triangular arrangement shown in FIG. 9. Iron-containing raw material may be introduced into bin 124 before or after introduction of cylindrical bars 124 into bin 124. Upon rotating bin 124, elongated bars 122 may wear the iron-containing raw material in the presence of nitrogen to form, on average, smaller anisotropically shaped particles that include iron nitride. In some examples, a powder generated by bar milling may include particles having an aspect ratio of at least 1.4, for example at least 5.0.

The elongated shape of elongated bars 122 may cause the iron-containing raw material to wear in an uneven or anisotropic fashion. In some examples, milling iron-containing raw material in the presence of a nitrogen source in bar milling apparatus 120 may form particles in the shape of needles, flakes, or laminations.

In some examples, at least some (or all) of the elongated bars may have a width (e.g., at least one dimension in a plane substantially orthogonal to their horizontal (long) axis) of between about 5 millimeters (mm) and about 50 mm. For example, cylindrically shaped elongated bars 122 may have a circular cross-section with a diameter between about 5 millimeters (mm) and about 50 mm. Elongated bars 122 may have other cross-sectional shapes as well. For example, in a plane substantially orthogonal to a horizontal (long) axis of an elongated bar, the elongated bar may have a square, rectangular, other polygonal, elliptical, or other closed curve shape. Further, in some examples, elongated bars 122 may have lengths along their horizontal (long) axes that are longer than the diameter of bin 124. In some examples, the iron-containing raw material introduced within bin 124 may occupy between about 20% and about 80% of the volume of bin 124 of bar milling apparatus 120.

In addition, in some examples, bin 124 may rotate at a speed of at least 250 rpm. In some of these examples, while bin 124 is rotating at least this speed, some or all of elongated bars 122 may remain disposed along an inner periphery of bin 124. Further, the iron-containing raw material, nitrogen source, and optional catalyst utilized in this bar milling technique may be the same as or substantially similar to iron-containing raw material 18, nitrogen source 20, and catalyst 22 described with reference to FIG. 2. Moreover, elongated bars 122 may be composed of the same or substantially similar materials as milling media 16 described herein, such as steel, stainless steel, or the like. Bar milling apparatus 120 may further include, in some examples, at least one support structure 128 configured to support bin 124 and/or other features of milling apparatus 120. For example, as shown in FIG. 10, support structure 128 may include brackets that engage and support opposing ends of bin 124. Support structure 128 also may include legs that engage the brackets. Further, one or more sets of bearings (not shown) may be positioned at one or more locations adjacent to bin 124, to facilitate rotation of bin 124 about an axis (e.g., horizontal axis) of bin 124. For example, a set of bearings may be positioned within support structure 128 and around at least a portion of the circumference of each opposing end of bin 124, such that each bearing may engage at least a portion of an outer circumference of bin 124 on one side, and support structure 128 and/or a component thereof on an opposing side. In these examples, the set of bearings may rotatably couple bin 124 and support structure 128.

In some examples, bar milling apparatus 120 may vibrate, for example, in a vertical direction as shown by arrow 127 in FIG. 10 and described with respect to vibration mode milling apparatus 40 of FIG. 4. In some examples, a motor may be at least mechanically coupled to bin 124 to cause bin 124 to rotate and/or vibrate. In general, the components of bar milling apparatus 120 may be composed of any suitable material selected such that the material does not react with the iron-containing raw material, nitrogen source, or optional catalyst utilized in connection with a bar milling technique.

Regardless of the milling technique used to form powder including anisotropic particles that include iron nitride, as described herein, the anisotropic particles may include at least one of FeN, $Fe_2N$ (e.g., ξ-$Fe_2N$), $Fe_3N$ (e.g., ε-$Fe_3N$), $Fe_4N$ (e.g., γ'-$Fe_4N$), $Fe_2N_6$, $Fe_8N$, $Fe_{16}N_2$ (e.g., α"-$Fe_{16}N_2$), or FeN (where x is between about 0.05 and about 0.5). Additionally, in some examples, the iron nitride powder may include other materials, such as pure iron, cobalt, nickel, dopants, or the like. In some examples, the cobalt, nickel, dopants, or the like may be at least partially removed after the milling process using one or more suitable techniques. Dopants within the particles of powder generated from milling may include, for example, at least one of aluminum (Al), manganese (Mn), lanthanum (La), chromium (Cr), cobalt (Co), titanium (Ti), nickel (Ni), zinc (Zn), a rare earth metal, boron (B), carbon (C), phosphorous (P), silicon (Si), or oxygen (O). In some examples, the iron nitride powder may be used in subsequent processes to form a magnetic material, such as a permanent magnet, including an iron nitride phase, such as $Fe_{16}N_2$. Milling an iron-containing raw material in the presence of a nitrogen source, such as ammonium nitrate or an amide- or hydrazine-containing liquid or solution, may be a cost-effective technique for forming an iron-nitride containing material. Further, milling an iron-containing raw material in the presence of a nitrogen source, such as ammonium nitrate or an amide- or hydrazine-containing liquid or solution, may facilitate mass production of iron nitride-containing material, and may reduce iron oxidation.

As described above, any of the milling techniques used to form anisotropic particles including iron nitride may utilize an iron-containing raw material. For any of the milling techniques described, prior to milling the iron-containing raw material in the presence of a nitrogen source, an iron precursor may be converted to the iron-containing raw material using, for example, a rough milling technique or a melting spinning technique. Rough milling an iron precursor material may form, on average, smaller sized particles of iron-containing raw material, for use in further processing, such as any of the fine milling techniques described in this disclosure. In some examples, the iron precursor (e.g., iron precursor 70 shown in FIG. 7A) may include at least one of Fe, $FeCl_3$, $Fe_2O_3$, or $Fe_3O_4$. In some implementations, the iron precursor may include particles with an average diameter greater than about 0.1 mm (100 μm). After rough milling, particles of the iron-containing raw material may have an average diameter of between about 50 nanometers and about 5 μm.

When the iron precursor is rough milled, any of the milling techniques described above may be utilized, for example rolling mode milling, stirring mode milling, vibration mode milling, or variations thereof described herein. In some examples, the iron precursor may be milled in the presence of at least one of calcium (Ca), aluminum (Al), or sodium (Na) under conditions sufficient to cause an oxidation reaction between the at least one of Ca, Al, or Na and any oxygen present in the iron precursor. The at least one of Ca, Al and/or Na may react with, for example, molecular oxygen or oxygen ions present in the iron precursor, if any. The oxidized at least one of Ca, Al, and/or Na then may be removed from the mixture. For example, the oxidized at least one of Ca, Al, and/or Na may be removed using at least one of a deposition technique, an evaporation technique, or an acid cleaning technique.

In some examples, the oxygen reduction process can be carried out by flowing hydrogen gas within the milling apparatus. The hydrogen may react with any oxygen present in the iron-containing raw material, and the oxygen may be removed from the iron-containing raw material. In some examples, this may form substantially pure iron (e.g., iron with less than about 10 at. % dopants). Additionally or alternatively, the iron-containing raw material may be cleaned using an acid cleaning technique. For example, diluted HCl, with a concentration between about 5% and about 50% can be used to wash oxygen from the iron-containing raw material. Milling iron precursors in a mixture with at least one of Ca, Al, and/or Na (or acid cleaning) may reduce iron oxidation and may be effective with many different iron precursors, including, for example, Fe, $FeCl_3$, $Fe_2O_3$, or $Fe_3O_4$, or combinations thereof. The milling of iron precursors may provide flexibility and cost advantages when preparing iron-containing raw materials for use in forming iron-nitride containing materials.

In other examples, the iron-containing raw material may be formed by melting spinning. In melting spinning, an iron precursor may be melted, e.g., by heating the iron precursor in a furnace to form molten iron precursor. The molten iron precursor then may be flowed over a cold roller surface to quench the molten iron precursor and form a brittle ribbon of material. In some examples, the cold roller surface may be cooled at a temperature below room temperature by a cooling agent, such as water. For example, the cold roller surface may be cooled at a temperature between about 10° C. and about 25° C. The brittle ribbon of material may then undergo a heat treatment step to pre-anneal the brittle iron material. In some examples, the heat treatment may be carried out at a temperature between about 200° C. and about 600° C. at atmospheric pressure for between about 0.1 hour and about 10 hours. In some examples, the heat treatment may be performed in a nitrogen or argon atmosphere. After heat-treating the brittle ribbon of material under an inert gas, the brittle ribbon of material may be shattered to form an iron-containing powder. This powder may be used as iron-containing raw material in the any of the disclosed milling techniques that generate a powder including iron nitride and/or anisotropic particles.

In general, the anisotropic particles including iron nitride generated according to the techniques of this disclosure may include one or more different iron nitride phases (e.g., $Fe_8N$, $Fe_{16}N_2$, $Fe_2N_6$, $Fe_4N$, $Fe_3N$, $Fe_2N$, FeN, and FeN (where x is between about 0.05 and 0.5)). The mixture then may be formed into a bulk material (e.g., a bulk magnetic material) via at least one of a variety of methods.

Prior to being formed into a bulk material, the anisotropically shaped particles including iron nitride generated according to any of the milling techniques of this disclosure may be annealed to enhance the formation of at least one $\alpha''$-$Fe_{16}N_2$ phase domain within the particles. For example, annealing anisotropic particles including iron nitride may convert at least some $Fe_8N$ phase domains in the anisotropic particles including iron nitride to $Fe_{16}N_2$ phase domains.

In some examples, annealing the anisotropic particles including iron nitride may include heating the particles to a temperature between about 100° C. and about 250° C., such as between about 120° C. and about 220° C., for example, between about 180° C. and 220° C. In some examples, annealing the anisotropic particles including iron nitride while straining the particles (e.g., applying a tensile force thereto) may facilitate conversion of at least some of the iron nitride phase domains to $\alpha''$-$Fe_{16}N_2$ phase domains. The annealing process may continue for a predetermined time that is sufficient to allow diffusion of the nitrogen atoms to the appropriate interstitial spaces in the iron crystal lattice. In some examples, the annealing process continues for between about 20 hours and about 200 hours, such as between about 40 hours and about 60 hours. In some examples, the annealing process may occur under an inert atmosphere, such as Ar, to reduce or substantially prevent oxidation of the iron. Further, in some implementations, while the anisotropic particles including iron nitride are annealed, the temperature is held substantially constant. The annealing (e.g., annealing while straining) of the anisotropic particles including iron nitride may result in an enhanced magnetic material including at least one α"-$Fe_{16}N_2$ phase domain.

In some examples, the anisotropic particles including iron nitride may be exposed to an external magnetic field during the annealing process. Annealing iron nitride materials in the presence of an applied magnetic field may enhance the $Fe_{16}N_2$ phase domain formation in iron nitride materials. Increased volume fractions of α"-$Fe_{16}N_2$ phase domains may improve the magnetic properties of the anisotropic particles including iron nitride. Improved magnetic properties may include, for example, coercivity, magnetization, and magnetic orientation.

In some examples, an applied magnetic field during annealing may be at least 0.2 Tesla (T). The temperature at which the magnetic field annealing is performed may at least partially depend upon further elemental additions to the iron nitride base composition and the approach used to initially synthesize the iron nitride base composition. In some examples, the magnetic field may be at least about 0.2T, at least about 2 T, at least about 2.5 T, at least about 6 T, at least about 7 T, at least about 8 T, at least about 9 T, at least about 10 T, or higher. In some examples, the magnetic field is between about 5 T and about 10 T. In other examples, the magnetic field is between about 8 T and about 10 T. Further details regarding annealing the materials including iron and nitrogen may be found in U.S. Provisional Application No. 62/019,046, filed Jun. 30, 2014, the entire content of which is incorporated herein by reference.

Figure 11:
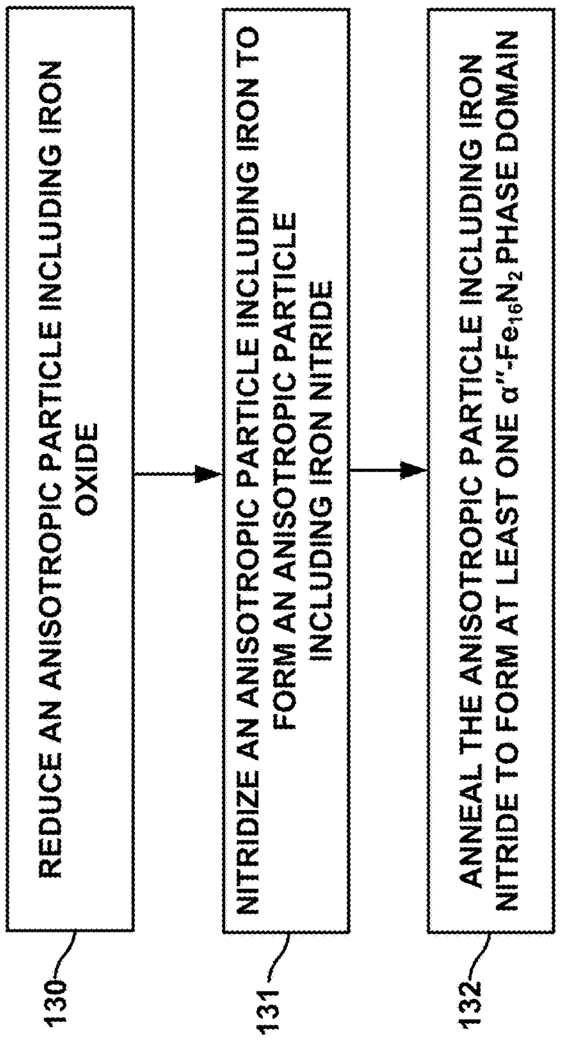
FIG. 11 is a flow diagram illustrating an example technique for forming an anisotropic particle including at least one $\alpha''$-$Fe_{16}N_2$ phase domain.

In some examples, rather than being formed using a milling technique, an anisotropic particle including at least one α"-$Fe_{16}N_2$ phase domain may be formed by nitridizing and annealing anisotropic shaped iron-containing precursors. FIG. 11 is a flow diagram illustrating an example technique for forming an anisotropic particle including at least one α"-$Fe_{16}N_2$ phase domain. Such an example technique may include, for example, nitridizing an anisotropic particle including iron to form an anisotropic particle including iron nitride (131).

The anisotropic particle including iron described in reference to this example technique may include, for instance, the iron-containing raw materials described herein in an anisotropic shape, such as iron powder, bulk iron, $FeCl_3$, $Fe_2O_3$, or $Fe_3O_4$. In some examples, an anisotropic particle including iron may include substantially pure iron (e.g., iron with less than about 10 atomic percent (at. %) dopants or impurities) in bulk or powder form. The dopants or impurities may include, for example, oxygen or iron oxide. In some examples, the anisotropic particle including iron may have an aspect ratio of at least about 1.4 (e.g., about 1.4), with aspect ratio being defined as described elsewhere in this disclosure. However, other aspect ratios may be suitable.

In some examples, prior to nitridizing an anisotropic particle including iron, the technique of FIG. 11 may optionally include reducing an anisotropic iron precursor to form the anisotropic particle including iron (130). An iron precursor utilized in such a step may include, for example, a bulk or powder sample including Fe, $FeCl_3$, or iron (e.g., $Fe_2O_3$ or $Fe_3O_4$), or combinations thereof. In some examples, the anisotropic iron precursor may include a powder including particles, where at least some (or all) of the particles have an aspect ratio of at least 1.4, as the term aspect ratio has been defined herein.

In some examples, reducing the anisotropic iron precursor may include reducing or removing oxygen content in the anisotropic iron precursor. For example, an oxygen reduction process can be carried out by exposing the anisotropic iron precursor to hydrogen gas. The hydrogen may react with any oxygen present in the anisotropic iron precursor, removing oxygen from the iron-containing raw material. In some examples, such a reduction step may form substantially pure iron within the anisotropic particle including iron (e.g., iron with less than about 10 at. % dopants). Additionally or alternatively, reducing the anisotropic iron precursor may include using an acid cleaning technique. For example, diluted HCl, with a concentration between about 5% and about 50% can be used to wash oxygen from the anisotropic iron precursor to form an anisotropic particle including iron (e.g., substantially pure iron, as described).

Nitridizing of the anisotropic particle including iron to form the anisotropic particle including iron nitride (131) may proceed in a number of manners. In general, nitrogen from a nitrogen source is combined with the anisotropic particle including iron to form an anisotropic particle including iron nitride. Such a nitrogen source may be the same as or similar to nitrogen sources described in elsewhere in this disclosure.

In some examples, nitridizing the anisotropic particle including iron may include heating the anisotropic particle including iron to a temperature for a time sufficient to allow diffusion of nitrogen to a predetermined concentration substantially throughout the volume of the anisotropic particle including iron. In this manner, the heating time and temperature are related, and may also be affected by the composition and/or geometry of the anisotropic particle including iron. For example, iron wire or sheet 28 may be heated to a temperature between about 125° C. and about 600° C. for between about 2 hours and about 9 hours.

In addition to heating the anisotropic particle including iron, nitridizing the anisotropic particle including iron may include exposing the anisotropic particle including iron to an atomic nitrogen substance, which diffuses into the anisotropic particle including iron. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$). The nitrogen may be supplied in a gas phase alone (e.g., substantially pure ammonia or diatomic nitrogen gas) or as a mixture with a carrier gas. In some examples, the carrier gas is argon (Ar).

In some examples, nitridizing the anisotropic particle including iron may include a urea diffusion process, in which urea is utilized as a nitrogen source (e.g., rather than diatomic nitrogen or ammonia). Urea (also referred to as carbamide) is an organic compound with the chemical formula $CO(NH_2)_2$. To nitridize the anisotropic particle including iron, urea may heated, e.g., within a furnace enclosing the anisotropic particle including iron, to generate decomposed nitrogen atoms which may diffuse into the anisotropic particle including iron. In some examples, the constitution of the resulting nitridized iron material may controlled to some extent by the temperature of the diffusion process as well as the ratio (e.g., the weight ratio) of the iron-containing workpiece to urea used for the process. Further details regarding these nitridizing processes (including urea diffusion) may be found in International Patent Application No. PCT/US12/51382, filed Aug. 17, 2012, the entire content of which is incorporated herein by reference.

The anisotropic particle including iron nitride formed according to the technique of FIG. 11 may be the same as or similar to the anisotropic particles including iron nitride generated in the milling techniques described herein. For example, the anisotropic particle including iron nitride may include one or more different iron nitride phases (e.g., $Fe_8N$, $Fe_{16}N_2$, $Fe_2N_6$, $Fe_4N$, $Fe_3N$, $Fe_2N$, FeN, and FeN (where x is between about 0.05 and 0.5)). The technique of FIG. 11 further includes annealing the anisotropic particle including iron nitride to form at least one α"-$Fe_{16}N_2$ phase domain within the anisotropic particle including iron nitride (132). Annealing of the anisotropic particle including iron nitride may be proceed under the same or similar conditions described above with respect to annealing of anisotropic particles including iron nitride formed by any of the milling techniques of this disclosure.

Upon nitridizing and annealing, the anisotropic particle including iron nitride may have an aspect ratio of at least 1.4, for example, between 1.4 and 2.0. The aspect ratio referenced in this technique is defined in the same way as other examples in this disclosure. Again, the aspect ratio for the anisotropic particle including iron nitride includes the ratio of the length of a longest dimension to the length of a shortest dimension of the anisotropic particle including iron nitride, where the longest dimension and the shortest dimension are substantially orthogonal.

In some examples, the anisotropic particle including iron that is nitridized according to this technique may be a single iron crystal. Hence, once nitridized, in such an example, an anisotropic particle including a single iron nitride crystal is annealed to form a α"-$Fe_{16}N_2$ phase domain within the iron nitride crystal. In some of these examples, the anisotropic particle including the iron nitride crystal may have an aspect ratio of at least 1.4.

In other examples, the anisotropic particle including iron may include a plurality of iron crystals. Hence, once nitridized, the plurality of iron crystals form a plurality of iron nitride crystals within the anisotropic particle. In such an example, annealing the plurality of iron nitride crystals may form at least one α"-$Fe_{16}N_2$ phase domain within some (or all) of the iron nitride crystals of the anisotropic particle. In some of these examples, the anisotropic particle including the iron nitride crystal may have an aspect ratio of at least 1.4.

In some examples, the described technique may be performed starting with a plurality of anisotropic particles including iron. For example, a plurality of anisotropic particles including iron may be nitridized under conditions described herein to form a plurality of anisotropic particles including iron nitride. In such an example, the plurality of anisotropic particles including iron nitride may be annealed under conditions described herein to form at least one α"-$Fe_{16}N_2$ phase domain within at least some (or all) of the anisotropic particles including iron nitride. In some of these examples, at least some (or all) of the plurality of anisotropic particles including iron nitride may have an aspect ratio of at least 1.4.

Figure 12:
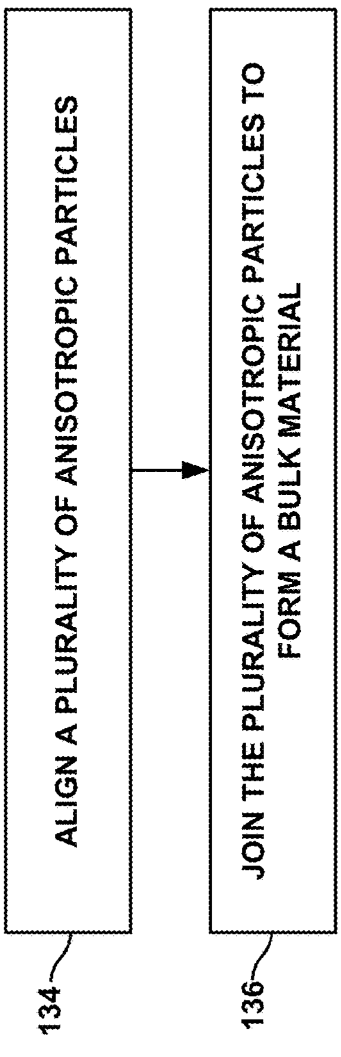
FIG. 12 is a flow diagram illustrating an example technique that includes aligning and joining a plurality of anisotropic particles including iron nitride to form a bulk material.

In some examples, a bulk material, such as a bulk permanent magnet, may be formed by the joining of anisotropic particles including iron nitride. FIG. 12 is a flow diagram illustrating an example technique that includes aligning and joining a plurality of anisotropic particles including iron nitride to form a bulk material. The technique illustrated in FIG. 12 includes aligning a plurality of anisotropically shaped particles including iron nitride, such that the longest dimensions of at least some of the respective anisotropic particles are substantially parallel (e.g., parallel or nearly parallel) (134). In some examples, at least some (or all) of the anisotropic particles including iron nitride may have an aspect ratio of at least 1.4, for example, an aspect ratio between 1.4 and 2.0. In these examples, the aspect ratio may be defined as described elsewhere in this disclosure. In some examples, some anisotropic particles of the plurality of anisotropic particles that are aligned may include iron nitride, have an anisotropic ratio of at least 1.4, both, or neither.

In some examples, the respective iron-nitride containing particles include at least one iron nitride crystal. In addition, some iron-nitride containing particles may include at least one of $Fe_8N$ or $Fe_{16}N_2$ phases. Further, in some examples, the <001> crystal axes of at least some iron nitride crystals of the plurality of iron nitride crystals may be substantially parallel to the respective longest dimensions of the plurality of anisotropic particles. Aligning the <001> crystal axes of the respective anisotropic particles including iron nitride (e.g., a magnetocrystalline easy axis <001> of $Fe_{16}N_2$) may provide uniaxial magnetic anisotropy to a magnetic material formed from the anisotropic particles.

In some examples, aligning the plurality of anisotropic particles may include exposing the anisotropic particles to a magnetic field, such that magnetic material within the anisotropic particles causes the anisotropic particles to align with the magnetic field. In some examples, the applied magnetic field utilized may have a strength between about 0.01 Tesla (T) and about 50 T. In these examples, the applied magnetic field may be, for example, a static magnetic field generated by a direct current (DC) mode electromagnet, a varying magnetic field generated by an alternating current (AC) mode electromagnet, or a pulse field generated by a pulsed magnet. In some examples, the strength of the applied magnetic field may vary along the direction of the magnetic field. For example, a gradient along the direction of the magnetic field may be between about 0.01 T/meter (m) and about 50 T/m.

The example technique of FIG. 12 also may include joining the plurality of anisotropic particles to form a bulk material including iron nitride (136), such as a bulk permanent magnet. Techniques for joining the anisotropic particles may include, for example, at least one of sintering, adhering, using a resin, alloying, soldering, using shock compression, using electrodischarge compression, or using electro-magnetic compaction. In joining the anisotropic particles, the bulk material formed may have a larger size than the individual anisotropic particles. In some examples, two or more methods of joining the anisotropic particles may be utilized in combination.

In some examples, joining a plurality of anisotropic particles including iron nitride, such as a $Fe_{16}N_2$ phase domain, may include alloying the particles using at least one of tin (Sn), Cu, Zn, or Ag to form an iron alloy at the interface of the anisotropic particles. For example, crystallite and/or atomic migration may cause the Sn to agglomerate. The anisotropic particles then may be pressed together and heated to form an iron-tin (Fe—Sn) alloy. The Fe—Sn alloy may be annealed at a temperature between about 150° C. and about 400° C. to join the plurality of anisotropic particles. In some examples, the annealing temperature may be sufficiently low that magnetic properties of the anisotropic particles may be substantially unchanged. In some examples, rather than Sn being used to join the anisotropic particles including iron nitride, copper (Cu), Zinc (Zn), or silver (Ag) may be used.

In some examples, joining the plurality of anisotropic particles to form a bulk material including iron nitride may include disposing the particles within a resin or other adhesive. Examples of resin or other adhesive include natural or synthetic resins, including ion-exchange resins, such as those available under the trade designation Amberlite™, from The Dow Chemical Company, Midland, Mich.; epoxies, such as Bismaleimide-Triazine (BT)-Epoxy; a polyacrylonitrile; a polyester; a silicone; a prepolymer; a polyvinyl buryral; urea-formaldehyde, or the like. Because resin or other adhesives may substantially fully encapsulate the plurality of anisotropic particles including iron nitride, the particles may be disposed substantially throughout the volume of resin or other adhesive. In some examples, the resin or other adhesive may be cured to bond the plurality of anisotropic particles including iron nitride to each other.

In some examples, joining anisotropic particles including iron nitride may include sintering. For example, sintering the anisotropic particles may include at least heating the anisotropic particles at a temperature between ambient temperature (about 23° C.) and about 200° C. In some examples, the sintered bulk material may be aged.

Further, in some examples, joining the plurality of anisotropic particles to form a bulk material may include magnetically coupling a plurality of ferromagnetic particles to iron nitride material, such as $Fe_{16}N_2$ hard magnetic material, within the anisotropic particles via exchange spring coupling. Exchange spring coupling may effectively harden the magnetically soft ferromagnetic particles and provide magnetic properties for the bulk material similar to those of a bulk material consisting essentially of $Fe_{16}N_2$. To achieve exchange spring coupling throughout the volume of the magnetic material, the $Fe_{16}N_2$ domains may be distributed throughout the magnetic structure, e.g., at a nanometer or micrometer scale. The ferromagnetic particles may include, for example, Fe, FeCo, $Fe_8N$, or combinations thereof. In some examples, the bulk material may be annealed at a temperature between about 50° C. and about 200° C. for between about 0.5 hours and about 20 hours to form a solid magnetic bulk material.

In some examples, joining the plurality of anisotropic particles to form a bulk material may include generating a compression shock that joins the anisotropic particles including iron nitride. In some examples, ferromagnetic particles may be disposed about the plurality of anisotropic particles including iron nitride. In other examples, solely a plurality of anisotropic particles including iron nitride may be used. As described above, in some examples, substantially aligning the longest dimensions of anisotropic particles including iron nitride may include substantially aligning the <001> crystal axes of the anisotropic particles, which may provide uniaxial magnetic anisotropy to bulk material or a magnet formed from anisotropic particles. In examples in which ferromagnetic particles are utilized, at least some ferromagnetic particles may be disposed between respective anisotropic particles including iron nitride.

In some examples, shock compression may include placing anisotropic particles including iron nitride (e.g., particles including iron nitride and having an aspect ratio of at least 1.4) between parallel plates. The anisotropic particles may be cooled by flowing liquid nitrogen through a conduit coupled to a back side of one or both of the parallel plates, e.g., to a temperature below 0° C. A gas gun may be used to impact one of the parallel plates with a burst of gas at a high velocity, such as about 850 m/s. In some examples, the gas gun may have a diameter between about 40 mm and about 80 mm.

In some further examples, joining the plurality of anisotropic particles to form a bulk material may include generating an electromagnetic field using a conductive coil through which a current may be applied. The current may be generated in a pulse to generate an electromagnetic force, which may help to consolidate the anisotropic particles including iron nitride, such as $Fe_{16}N_2$ phase domains. In some examples, ferromagnetic particles may be disposed about the anisotropic particles. Further, in some examples, the anisotropic particles including iron nitride may be disposed within an electrically conductive tube or container within the bore of the conductive coil. The conductive coil may be pulsed with a high electrical current to produce a magnetic field in the bore of conductive coil that, in turn, induces electrical currents in the electrically conductive tube or container. The induced currents interact with the magnetic field generated by conductive coil to produce an inwardly acting magnetic force that collapses the electrically conductive tube or container. The collapsing electromagnetic container or tube transmits a force to the anisotropic particles including iron nitride and joins the particles. After the consolidation of the anisotropic particles including iron nitride with the ferromagnetic particles, the ferromagnetic particles may be magnetically coupled to hard magnetic material within the anisotropic particles, such as at least one $Fe_{16}N_2$ phase domain, via exchange spring coupling. In some examples, this technique may be used to produce bulk material that has at least one of cylindrical symmetry, a high aspect-ratio, or a net shape (a shape corresponding to a desired final shape of the workpiece). As stated above, the ferromagnetic particles may include, for example, Fe, FeCo, $Fe_8N$, or combinations thereof.

In any of the above examples, other techniques for assisting consolidation of a plurality of anisotropic particles including iron nitride may be used, such as pressure, electric pulse, spark, applied external magnetic fields, a radio frequency signal, laser heating, infrared heating, for the like. Each of these example techniques for joining a plurality of anisotropic particles including iron nitride may include relatively low temperatures such that the temperatures used may leave any $Fe_{16}N_2$ phase domains substantially unmodified (e.g., such that $Fe_{16}N_2$ phase domains are not converted to other types of iron nitride).

In other examples, a disclosed technique may include joining the plurality of anisotropic particles to form a workpiece. Workpieces may take a number of forms, such as a wire, rod, bar, conduit, hollow conduit, film, sheet, or fiber, each of which may have a wide variety of cross-sectional shapes and sizes, as well as any combinations thereof. One or more of the described joining techniques may be utilized to join anisotropic particles to form the workpiece. In some examples, a workpiece may include a bulk material as described.

The disclosure also describes a material that includes an anisotropic particle including at least one iron nitride crystal. In some examples, the anisotropic particle may have an aspect ratio of at least 1.4, with aspect ratio being defined as described herein. In some examples, the material may include an anisotropic particle having at least one iron nitride crystal, and the anisotropic particle may have an aspect ratio of at least 1.4. Further, in some examples, the at least one iron nitride crystal may include $\alpha''$-$Fe_{16}N_2$.

Moreover, in some examples of these materials, <001> crystal axes of a plurality of iron nitride crystals may be substantially parallel, and the longest dimension of the anisotropic particle may be substantially parallel to the substantially parallel <001> crystal axes of the iron nitride crystals. Substantially parallel alignment of <001> crystal axes (in some examples, easy axes) of the iron nitride crystals, coupled with substantially parallel alignment of the <001> crystal axes with the longest dimension of an anisotropic particle, may result in enhanced magnetic properties.

For example, magnetic anisotropy at the level of crystal units coupled with shape anisotropy of a particle including magnetic material, may result in a particle that exhibits enhanced coercivity, magnetization, magnetic orientation, and/or energy product, as compared to materials having randomly ordered crystals and/or an isotropic shape.

In some example materials according to this disclosure, a length of the anisotropic particle measured in the direction of the substantially parallel <001> crystal axes of the plurality of iron nitride crystals may be at least about 1.4 times the length of the anisotropic particle measured in at least one of the substantially orthogonal direction of the <100> crystal axes of the plurality of iron nitride crystals of the anisotropic particle, or the substantially orthogonal direction of the <010> crystal axes of the plurality of iron nitride crystals of the anisotropic particle, corresponding to an aspect ratio of 1.4. In such an example, the <100> crystal axes of the plurality of iron nitride crystals also may be substantially parallel.

In some examples, a cross-section of the anisotropic particle of the material, taken orthogonal to the substantially parallel <001> crystal axes of the iron nitride crystals, may be substantially circular. For example, the particle may have a needle shape. In other examples, a cross-section of the anisotropic particle taken in a plane orthogonal to the substantially aligned <001> crystal axes of the iron crystals may be substantially rectangular, such that the particle has a flake shape. Other anisotropic particle shapes and cross-sections of those shapes are contemplated by this disclosure as well, as described above.

For example, in some example materials, the length of an anisotropic particle measured in the direction of substantially parallel <001> crystal axes may be about 1 micron (μm), and the length of the anisotropic particle measured in the direction of at least one of the substantially parallel <100> crystal axes or the substantially parallel <010> crystal axes may be between about 200 nm and 500 nm.

In some examples, an example material may include a plurality of anisotropic particles. In some such examples, the longest dimensions of the anisotropic particles may be substantially parallel. For example, the longest dimensions may be aligned by exposure to a magnetic field, such that a magnetic moment along the longest dimension of the anisotropic particles aligns with the applied magnetic field. Further, the plurality of anisotropic particles, including the example when the longest dimensions thereof are aligned, may take the form of a bulk permanent magnet.

The iron nitride materials formed by the techniques described herein may be used as magnetic materials in a variety of applications, including, for example, bulk permanent magnets. Bulk permanent magnets may include a minimum dimension of at least about 0.1 mm. In some examples, the bulk material including iron nitride may be annealed in the presence of an applied magnetic field. In other examples, iron nitride materials annealed in the presence of an applied magnetic field may not be bulk materials (may have a minimum dimension less than about 0.1 mm), and the iron nitride materials may be consolidated with other iron nitride materials to form bulk permanent magnets. Examples of techniques that may be used to consolidate iron nitride magnetic materials are described, for example, in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET," the entire content of which is incorporated herein by reference. Other examples are described in International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET," the entire content of which is incorporated herein by reference. Still other examples are described in International Patent Application Number PCT/US2014/043902, filed on Jun. 24, 2014, and titled "IRON NITRIDE MATERIALS AND MAGNETS INCLUDING IRON NITRIDE MATERIALS," the entire content of which is incorporated herein by reference.

Clause 1: A method comprising: milling an iron-containing raw material in the presence of a nitrogen source to generate a powder including a plurality of anisotropic particles, wherein at least some particles of the plurality of anisotropic particles include iron nitride, wherein at least some particles of the plurality of anisotropic particles have an aspect ratio of at least 1.4, wherein the aspect ratio for an anisotropic particle of the plurality of anisotropic particles comprises the ratio of the length of a longest dimension to the length of a shortest dimension of the anisotropic particle, and wherein the longest dimension and the shortest dimension are substantially orthogonal.

Clause 2: The method of clause 1, wherein milling the iron-containing raw material comprises milling the iron-containing raw material for between about 20 hours and about 65 hours in a bin of a rolling mode milling apparatus, a stirring mode milling apparatus, or a vibration mode milling apparatus.

Clause 3: The method of clause 1, wherein milling the iron-containing raw material comprises milling the iron-containing raw material under a pressure of between about 0.1 gigapascals (GPa) and about 20 GPa in a bin of a rolling mode milling apparatus, a stirring mode milling apparatus, or a vibration mode milling apparatus.

Clause 4: The method of clause 3, wherein a gas flows into the bin to create the pressure, wherein the gas comprises at least one of air, nitrogen, argon, or ammonia.

Clause 5: The method of clause 1, wherein milling the iron-containing raw material comprises milling the iron-containing raw material at a temperature between about −196.15° C. and about 23° C. in a bin of a rolling mode milling apparatus, a stirring mode milling apparatus, or a vibration mode milling apparatus.

Clause 6: The method of clause 5, wherein the iron-containing raw material is cooled by liquid nitrogen to a temperature of about −196.15° C. when milled.

Clause 7: The method of clause 1, wherein milling the iron-containing raw material comprises milling the iron-containing raw material in the presence of a magnetic field in a bin of a rolling mode milling apparatus, a stirring mode milling apparatus, or a vibration mode milling apparatus.

Clause 8: The method of clause 7, wherein the magnetic field has a strength between about 0.1 tesla (T) and about 10 T.

Clause 9: The method of clause 7 or 8, wherein the bin of the rolling mode milling apparatus or the vibration mode milling apparatus rotates at a speed of about 50 revolutions per minute (rpm) to about 500 rpm, or wherein a shaft of the stirring mode milling apparatus rotates at about 50 rpm to about 500 rpm, and wherein at least one paddle extends radially from the shaft.

Clause 10: The method of any one of clauses 7 to 9, wherein the iron-containing raw material comprises an iron-containing powder, and wherein the magnetic field substantially maintains at least one particle of the iron-containing powder in a particular orientation, such that at least a first surface of the at least one particle is worn more than a second surface of the at least one particle.

Clause 11: The method of clause 10, wherein an easy axis of at least one iron nitride crystal of the at least one particle of the iron-containing powder is substantially parallel to a direction of the magnetic field for at least a portion of the time the iron-containing powder is milled.

Clause 12: The method of clause 1, wherein milling the iron-containing raw material comprises milling the iron-containing raw material in the presence of an electric field in a bin of a rolling mode milling apparatus, a stirring mode milling apparatus, or a vibration mode milling apparatus.

Clause 13: The method of clause 12, wherein the electric field comprises an alternating current that has a frequency of up to 10 megahertz (MHz) and a power between about 0.1 watts (W) and 100 W.

Clause 14: The method of clause 12, wherein the electric field comprises a direct current that has a voltage between about 10 volts (V) and about 10,000 V.

Clause 15: The method of clause 1, wherein milling the iron-containing raw material comprises milling the iron-containing raw material with a plurality of elongated bars in a bin of a rolling mode milling apparatus or a vibration mode milling apparatus.

Clause 16: The method of clause 15, wherein at least some particles of the plurality of anisotropic particles have an aspect ratio of at least 5.0.

Clause 17: The method of clause 15 or 16, wherein the plurality of elongated bars comprises a plurality of cylindrical bars, and wherein each cylindrical bar of the plurality of cylindrical bars has a diameter between about 5 millimeters (mm) and about 50 mm.

Clause 18: The method of any one of clauses 15 to 17, wherein the iron-containing raw material occupies between about 20% and about 80% of the volume of the bin of the rolling mode milling apparatus or the vibration mode milling apparatus.

Clause 19: The method of any one of clauses 15 to 18, wherein the bin of the rolling mode milling apparatus or the vibration mode milling apparatus rotates at a speed greater than 250 rpm.

Clause 20: The method of any one of clauses 1 to 19, wherein at least one dimension of at least some particles of the plurality of anisotropic particles is between about 5 nanometers (nm) and about 50 nm in length.

Clause 21: The method of any one of clauses 1 to 20, further comprising, prior to milling the iron-containing raw material in the presence of the nitrogen source, milling an iron precursor to form the iron-containing raw material, wherein the iron precursor comprises at least one of iron (Fe), $FeCl_3$, $Fe_2O_3$, or $Fe_3O_4$.

Clause 22: The method of clause 21, wherein milling the iron precursor to form the iron-containing raw material comprises milling the iron precursor in the presence of at least one of Ca, Al, or Na under conditions sufficient to cause an oxidation reaction between the at least one of Ca, Al, or Na and oxygen present in the iron precursor.

Clause 23: The method of any one of clauses 1 to 22, wherein the nitrogen source comprises at least one of ammonia, ammonium nitrate, an amide-containing material, or a hydrazine-containing material.

Clause 24: The method of clause 23, wherein the amide-containing material comprises at least one of a liquid amide, a solution containing an amide, carbamide, methanamide, benzamide, or acetamide, and wherein the hydrazine-containing material comprises at least one of a hydrazine or a solution containing the hydrazine.

Clause 25: The method of any one of clauses 1 to 24, further comprising adding a catalyst to the iron-containing raw material.

Clause 26: The method of clause 25, wherein the catalyst comprises at least one of nickel or cobalt.

Clause 27: The method of any one of clauses 1 to 26, wherein the at least some anisotropic particles including iron nitride comprise at least one of FeN, $Fe_2N$, $Fe_3N$, $Fe_4N$, $Fe_2N_6$, $Fe_8N$, $Fe_{16}N_2$, or $FeN_x$, wherein x is in the range of from about 0.05 to about 0.5.

Clause 28: The method of clause 27, wherein the iron nitride comprises at least one $\alpha''$-$Fe_{16}N_2$ phase domain.

Clause 29: The method of any one of clauses 1 to 28, wherein the iron-containing raw material further comprises at least one dopant, wherein at least some of the particles of the plurality of anisotropic particles include the at least one dopant, and wherein the at least one dopant comprises at least one of Al, Mn, La, Cr, Co, Ti, Ni, Zn, a rare earth metal, B, C, P, Si, or O.

Clause 30: An apparatus configured to perform the method of any one of clauses 1 to 29.

Clause 31: A material formed by the method of any one of clauses 1 to 29.

Clause 32: A material comprising: an anisotropic particle comprising at least one iron nitride crystal, wherein the anisotropic particle has an aspect ratio of at least 1.4, wherein the aspect ratio comprises the ratio of the length of a longest dimension of the anisotropic particle to the length of a shortest dimension of the anisotropic particle, and wherein the longest dimension and the shortest dimension are substantially orthogonal.

Clause 33: The material of clause 32, wherein the at least one iron nitride crystal comprises $\alpha''$-$Fe_{16}N_2$.

Clause 34: The material of clause 32 or 33, wherein the at least one iron nitride crystal comprises a plurality of iron nitride crystals, and wherein the respective <001> crystal axes of the plurality of iron nitride crystals are substantially parallel.

Clause 35: The material of clause 34, wherein the longest dimension of the anisotropic particle is substantially parallel to the substantially parallel respective <001> crystal axes of the plurality of iron nitride crystals.

Clause 36: The material of clause 34 or 35, wherein the length of the anisotropic particle measured in the direction of the substantially parallel <001> crystal axes of the plurality of iron nitride crystals is at least about 1.4 times the length of the anisotropic particle measured in at least one of a substantially orthogonal direction of the <100> crystal axes of the plurality of iron nitride crystals of the anisotropic particle or a substantially orthogonal direction of the <010> crystal axes of the plurality of iron nitride crystals of the anisotropic particle.

Clause 37: The material of clause 36, wherein the length of the anisotropic particle measured in the direction of the substantially parallel <001> crystal axes is about 1 micron (µall) and the length of the anisotropic particle measured in the direction of at least one of the substantially parallel <100> crystal axes or the substantially parallel <010> crystal axes is between about 200 nanometers (nm) and 500 nm.

Clause 38: The material of any one of clauses 34 to 37, wherein at least some iron nitride crystals of the plurality of iron nitride crystals comprise at least one $\alpha''$-$Fe_{16}N_2$ phase domain.

Clause 39: The material of any one of clauses 32 to 38, wherein the anisotropic particle comprises a plurality of anisotropic particles.

Clause 40: The material of clause 39, wherein the respective longest dimensions of respective particles of the plurality of anisotropic particles are substantially parallel.

Clause 41: A bulk permanent magnet comprising the material of clause 39 or 40.

Clause 42: A method comprising: aligning a plurality of anisotropic particles, such that the longest dimensions of respective anisotropic particles of the plurality of anisotropic particles are substantially parallel, wherein at least some anisotropic particles of the plurality of anisotropic particles comprise iron nitride and have an aspect ratio of at least 1.4, wherein the aspect ratio comprises the ratio of the length of the longest dimension of an anisotropic particle to the length of the shortest dimension of the anisotropic particle, and wherein the longest dimension and the shortest dimension are substantially orthogonal; and joining the plurality of anisotropic particles to form a bulk material comprising iron nitride.

Clause 43: The method of clause 42, wherein each anisotropic particle of the plurality of anisotropic particles includes at least one iron nitride crystal, and wherein the respective <001> crystal axes of at least some of the at least one iron nitride crystals of the plurality of anisotropic particles are substantially parallel to the longest dimensions of the respective anisotropic particles.

Clause 44: The method of clause 42 or 43, wherein aligning the plurality of anisotropic particles comprises exposing the anisotropic particles to a magnetic field.

Clause 45: The method of clause 44, wherein the magnetic field has a strength between about 0.01 Tesla (T) and about 50 T.

Clause 46: The method of any one of clauses 42 to 45, wherein joining the plurality of anisotropic particles comprises at least one of sintering, adhering, alloying, soldering, using a resin or binder on, using shock compression on, or using electrodischarge on the plurality of anisotropic particles.

Clause 47: The method of clause 46, wherein sintering the plurality of anisotropic particles comprises heating the plurality of anisotropic particles at a temperature between about 23° C. and about 200° C.

Clause 48: The method of any one of clauses 42 to 47, wherein the bulk material comprises a bulk permanent magnet.

Clause 49: The method of any one of clauses 42 to 48, wherein the iron nitride comprises at least one $\alpha''$-$Fe_{16}N_2$ phase domain.

Clause 50: An apparatus comprising: a plurality of elongated bars, wherein at least some of elongated bars of the plurality of elongated bars have a width between about 5 millimeters (mm) and about 50 mm; a bin configured to house the plurality of elongated bars; at least one support structure configured to support the bin; and a means for rotating the bin about an axis of the bin.

Clause 51: The apparatus of clause 50, further comprising a means for vibrating the bin.

Clause 52: The apparatus of clause 50 or 51, further comprising a means for rotatably coupling the support structure and the bin.

Clause 53: The apparatus of any one of clauses 50 to 52, wherein the bin is configured to rotate at a speed greater than 250 revolutions per minute (rpm).

Clause 54: The apparatus of any one of clauses 50 to 53, wherein the means for rotating the bin comprises a motor mechanically coupled to the bin.

Clause 55: The apparatus of any one of clauses 50 to 54, wherein each elongated bar of the plurality of elongated bars has a length along a horizontal axis of the elongated bar that is longer than a diameter of the bin.

Clause 56: An apparatus comprising: a plurality of milling media; a bin configured to house the plurality of milling media; a generator comprising at least one of a spark discharge mode or a glow discharge mode, wherein the generator is configured to generate an electric field within the bin; a first wire comprising a first end and a second end, wherein the first end of the first wire is affixed to at least one milling medium and the second end of the first wire is electrically coupled to a first terminal of the generator; a second wire comprising a first end and a second end, wherein the first end of the second wire is electrically coupled to the bin and a ground and the second end of the second wire is electrically coupled to a second terminal of the generator; at least one support structure configured to support the bin; and a means for rotating the bin about an axis of the bin.

Clause 57: The apparatus of clause 56, further comprising a means for vibrating the bin.

Clause 58: The apparatus of clause 56 or 57, further comprising a means for rotatably coupling the support structure and the bin.

Clause 59: An apparatus comprising: a plurality of milling media; a bin configured to house the plurality of milling media; a means for generating a magnetic field within the bin; at least one support structure configured to support the bin; and a means for rotating the bin about an axis of the bin.

Clause 60: The apparatus of clause 59, further comprising a means for vibrating the bin.

Clause 61: The apparatus of clause 59 or 60, further comprising a means for rotatably coupling the support structure and the bin.

Clause 62: A method comprising: nitridizing an anisotropic particle including iron to form an anisotropic particle including iron nitride; and annealing the anisotropic particle including iron nitride to form at least one $\alpha''$-$Fe_{16}N_2$ phase domain within the anisotropic particle including iron nitride, wherein the anisotropic particle including iron nitride has an aspect ratio of at least 1.4, wherein the aspect ratio for the anisotropic particle including iron nitride comprises the ratio of the length of a longest dimension to the length of a shortest dimension of the anisotropic particle including iron nitride, and wherein the longest dimension and the shortest dimension are substantially orthogonal.

Clause 63: The method of clause 62, further comprising, prior to nitridizing the anisotropic particle including iron, reducing an anisotropic iron precursor to form the anisotropic particle including iron.

Clause 64: The method of clause 63, wherein the anisotropic iron precursor comprises an anisotropic particle including iron oxide.

Clause 65: The method of clause 63 or 64, wherein reducing the anisotropic iron precursor comprises exposing the iron precursor to hydrogen gas to form the anisotropic particle including iron.

Clause 66: The method of any one of clauses 62 to 65, wherein annealing the anisotropic particle including iron nitride comprises heating the anisotropic particle including iron nitride at a temperature between about 100° C. and about 250° C. for between about 20 hours and about 200 hours.

Clause 67: The method of any one of clauses 62 to 66, wherein the anisotropic particle including iron includes a plurality of anisotropic particles including iron, wherein the plurality of anisotropic particles including iron are nitridized to form a plurality of anisotropic particles including iron nitride, and wherein the plurality of anisotropic particles including iron nitride are annealed to form at least one α"-$Fe_{16}N_2$ phase domain within at least some of the anisotropic particles including iron nitride of the plurality of anisotropic particles including iron nitride.

Clause 68: A workpiece comprising the anisotropic particles made by the method of any one of clauses 1-29, 42-49 or 62-67.

Clause 69: The workpiece of clause 68, wherein the workpiece is a film or wire.

Clause 70: The workpiece of clause 68, wherein the workpiece is a wire, rod, bar, conduit, hollow conduit, film, sheet, or fiber.

EXAMPLES

Example 1

Figure 13:
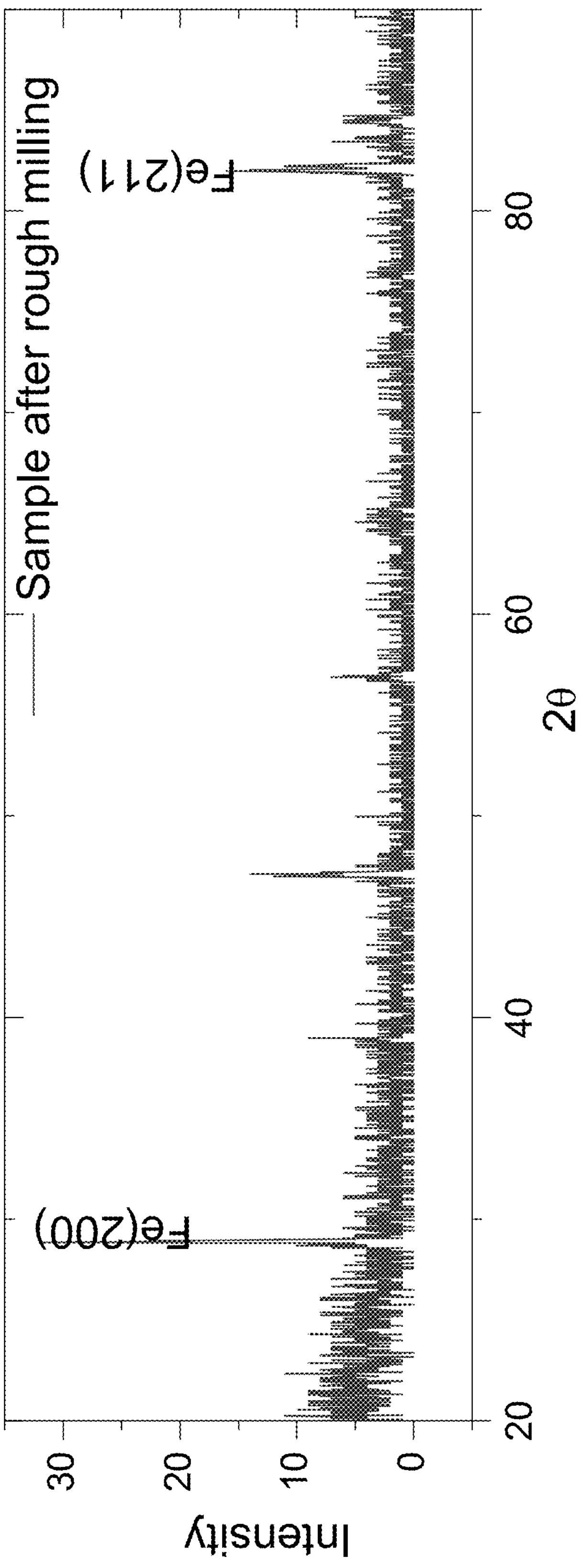
FIG. 13 illustrates an example XRD spectrum for a sample of iron-containing raw material prepared by rough milling an iron precursor.

FIG. 13 illustrates an example XRD spectrum of a sample of iron-containing raw material prepared by rough milling an iron precursor. In this example, an iron precursor in the form of pure iron pieces was rough milled for between about 10 to 50 hours in a bin (e.g., a jar) of the PM 100 planetary ball milling apparatus (as described above) to form an iron-containing powder. During the rough milling of the iron precursor, the jar was filled with gas including nitrogen and argon. Steel milling spheres with a diameter of between about 10 mm and about 20 mm were used to mill, and the ball-to-powder mass ratio was about 5:1. As shown in the x-ray diffraction spectrum (XRD), after rough milling the pure iron pieces, an iron-containing raw material was formed that included Fe(200) and Fe(211) crystal phases. The XRD spectrum was collected using a D5005 x-ray diffractometer with a Cu radiation source.

Figure 14:
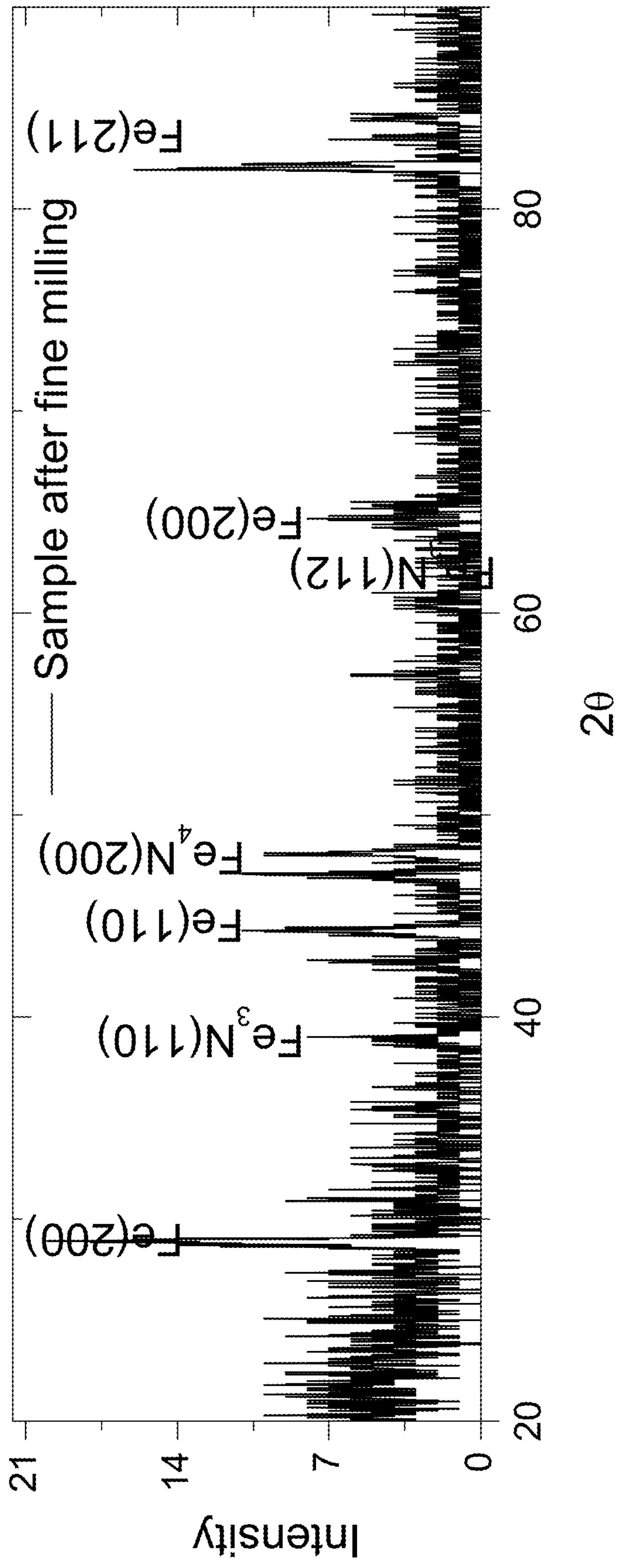
FIG. 14 illustrates an example XRD spectrum for a sample of particles including iron nitride generated by milling iron-containing raw material.

FIG. 14 illustrates an example XRD spectrum of a sample of particles including iron nitride generated by fine milling iron-containing raw material. In this example, the iron-containing powder whose XRD is illustrated in the FIG. 13 spectrum was fine milled with ammonium nitrate for between about 20 hours and about 60 hours in a jar of the PM 100 planetary ball milling apparatus to form a powder including a plurality of anisotropic particles including iron nitride. During the fine milling of the iron precursor, the jar of the PM 100 planetary ball milling apparatus was filled with nitrogen gas. Milling spheres with a diameter of between about 1 mm and about 5 mm were used to mill, and the ball-to-powder mass ratio was about 5:1. As shown in the XRD spectrum, after fine milling the iron-containing raw material in the presence of ammonium nitrate, the powder containing particles including iron nitride included Fe(200), $Fe_3N$(110), Fe(110), $Fe_4N$(200), $Fe_3N$(112), Fe, (200), and Fe(211) crystal phases. For example, at least particles including $Fe_3N$ and $Fe_4N$ crystal phases may be formed in an anisotropic shape. Again, the XRD spectrum was collected using a D5005 x-ray diffractometer with a Cu radiation source.

Example 2

Table 1 below presents four samples of powder including anisotropic particles that include iron nitride generated by milling with steel milling spheres in the PM 100 planetary milling apparatus, i.e., FeN 90, FeN 91, FeN 92, and FeN93. For each sample, prior to milling in the PM 100 planetary ball milling apparatus, an iron-containing pieces were pre-annealed in a hydrogen environment at 100° C. for about 2 hours to reduce the carbon content in the iron-containing pieces. The iron-containing pieces were then milled in the PM 100 planetary ball milling apparatus (described above) in the presence of ammonium nitrate ($NH_4NO_3$) as a nitrogen source in a 1:1 weight ratio between the iron-containing pieces and the ammonium nitrate. For each sample, 10 steel balls, each having a diameter of about 5 mm, were used. Each time 10 hours of milling was complete, the milling apparatus was stopped for 10 minutes to allow the system to cool. After ball milling, each generated anisotropically shaped iron nitride-containing particles were post-annealed at the temperatures and for the time periods noted in Table 1.

TABLE 1

| Sample | Description |
|---|---|
| FeN 90 | Carbon reduction, with annealing at 220° C. for 90 hrs |
| FeN 91 | Carbon reduction, with annealing at 220° C. for 90 hrs |
| FeN 92 | Carbon reduction, with annealing at 220° C. for 72 hrs |
| FeN 93 | Carbon reduction, with annealing at 220° C. for 72 hrs + 90 hrs |

Table 2 below presents the coercivity (Hc) and saturation magnetization (Ms) measured for each of samples FeN 90 through FeN 93, after undergoing carbon reduction and annealing as described above.

TABLE 2

| Sample | Magnetic Properties |
|---|---|
| FeN 90 | $H_c$ = 540 Oe, $M_s$ = 209 emu/g |
| FeN 91 | $H_c$ = 380 Oe, $M_s$ = 186 emu/g |
| FeN 92 | $H_c$ = 276 Oe, $M_s$ = 212 emu/g |
| FeN 93 | $H_c$ = 327 Oe, $M_s$ = 198 emu/g |

Figure 15A:
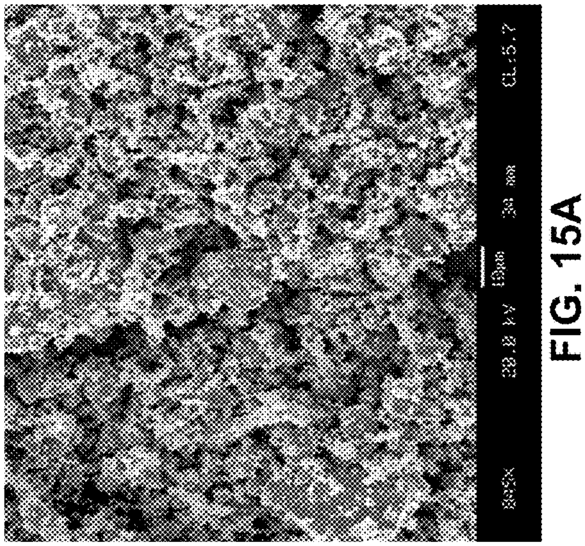
FIGS. 15A-15D are example images of ball milling samples generated by a scanning electron microscope.
Figure 15B:
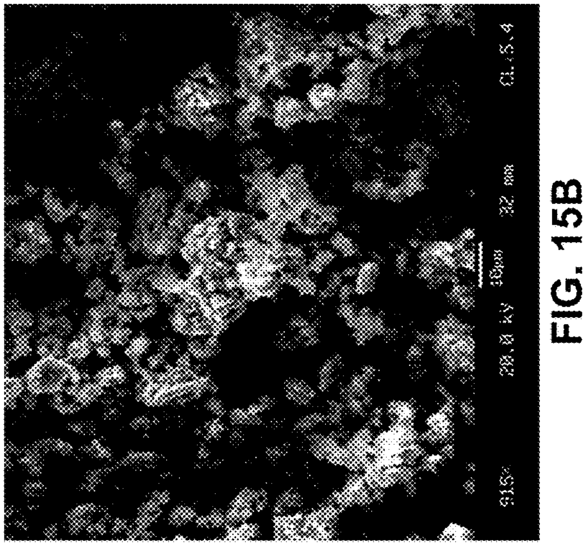
Figure 15C:
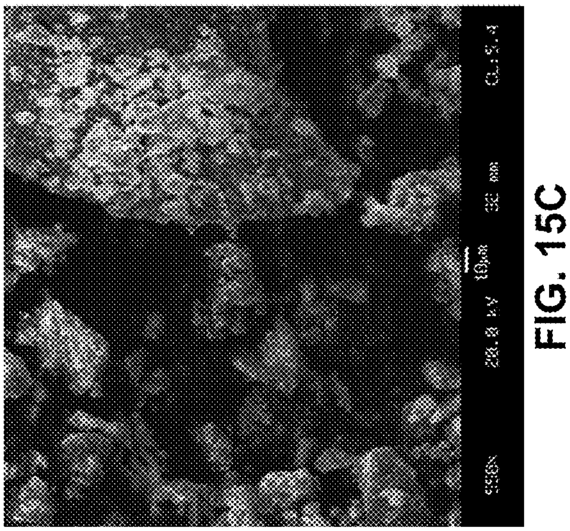
Figure 15D:
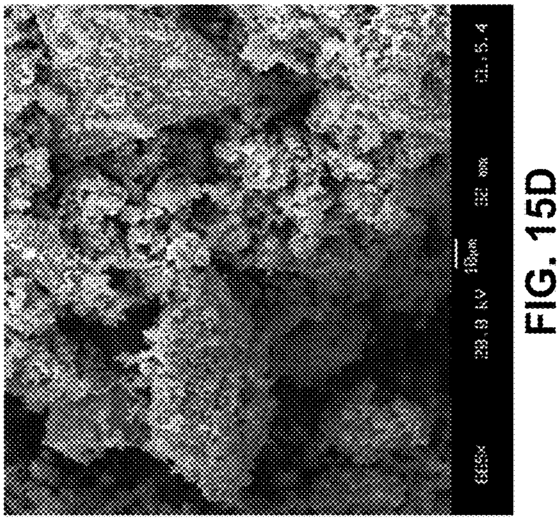

FIGS. 15A-15D are example images generated by a scanning electron microscope of ball milling samples. In particular, FIG. 15A shows an image of sample FeN 90 at a magnification of 845 times, FIG. 15B shows an image of sample FeN 91 at a magnification of 915 times the size of the sample, FIG. 15C shows an image of sample FeN 92 at a magnification of 550 times the size of the sample, and FIG. 15D shows an image of sample FeN 93 at a magnification of 665 times the size of the sample.

Figure 16A:
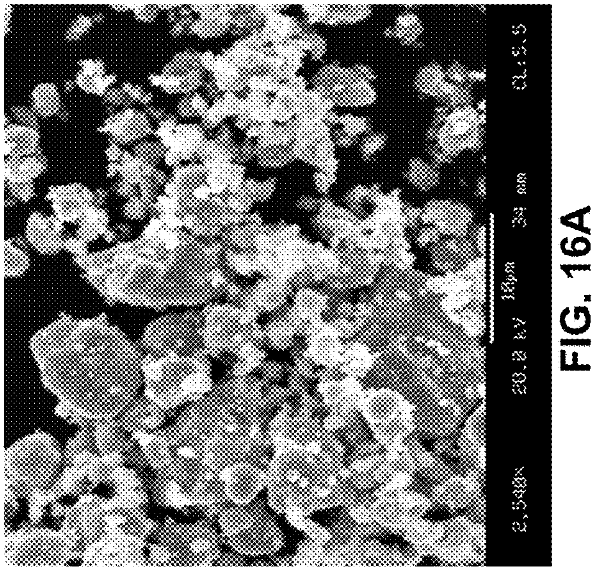
FIGS. 16A-16D also are example images of ball milling samples generated by a scanning electron microscope.
Figure 16B:
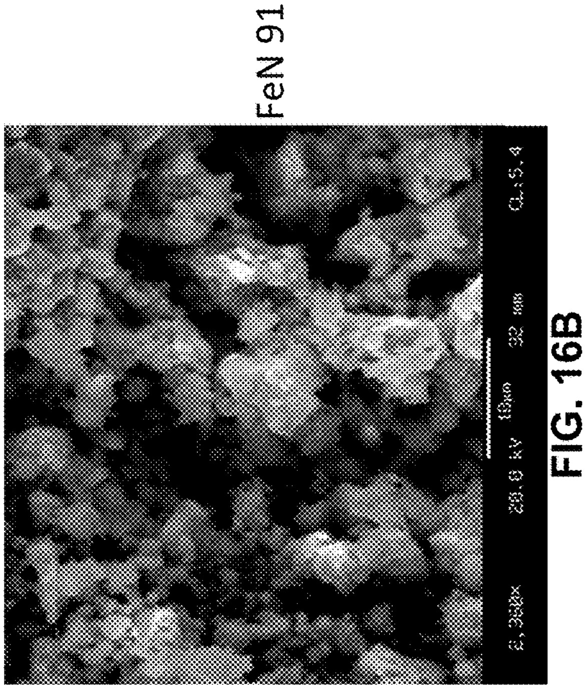
Figure 16C:
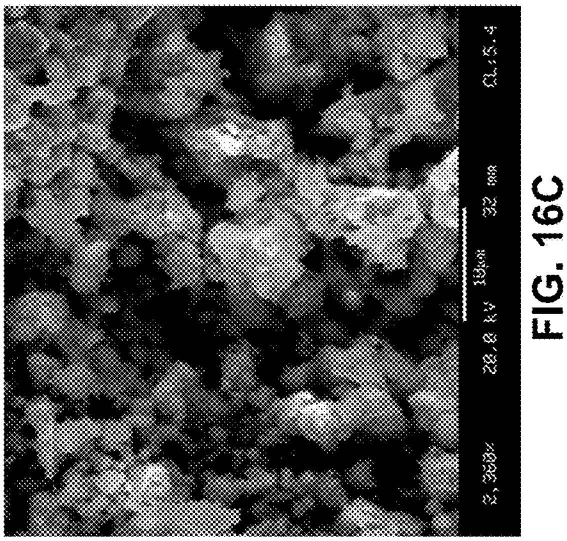
Figure 16D:
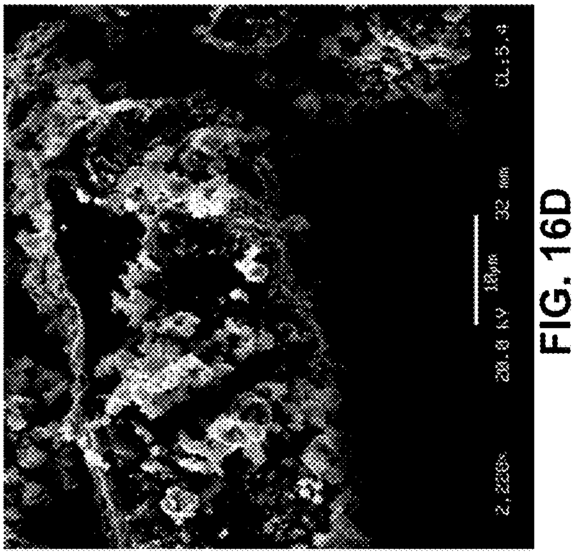

Further, FIGS. 16A-16D also are example images generated by a scanning electron microscope of ball milling samples. In particular, FIG. 16A shows an image of sample FeN 90 at a magnification of 2,540 times the size of the sample, FIG. 16B shows an image of sample FeN 91 at a magnification of 2,360 times the size of the sample, FIG. 16C shows an image of sample FeN 92 at a magnification of 2,360 times the size of the sample, and FIG. 16D shows an image of sample FeN 93 at a magnification of 2,220 times the size of the sample. FIGS. 15A-15D and 16A-16D show, among other features, the size of the anisotropic particles generated by milling with steel spheres using the PM 100 planetary ball milling apparatus.

Figure 17:
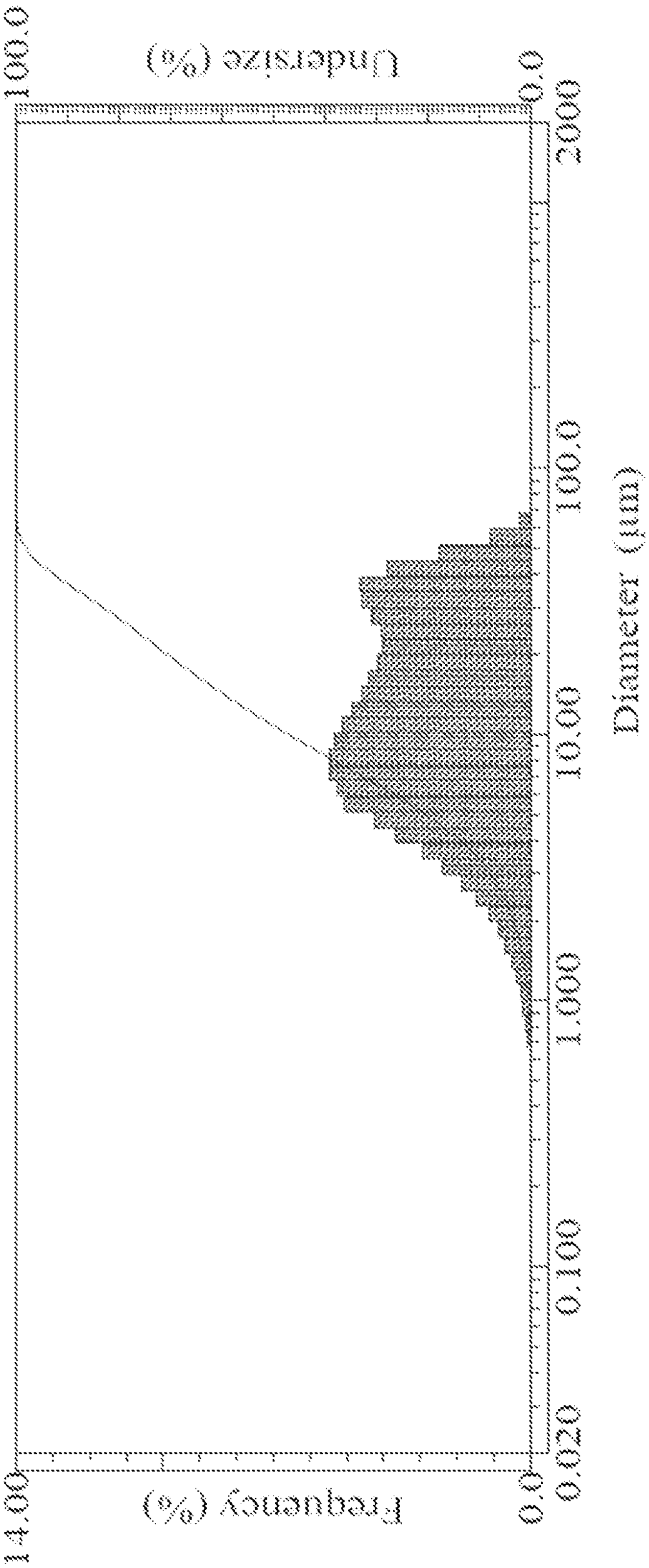
FIG. 17 is a diagram illustrating an example size distribution of a sample powder generated by ball milling.
Figure 18:
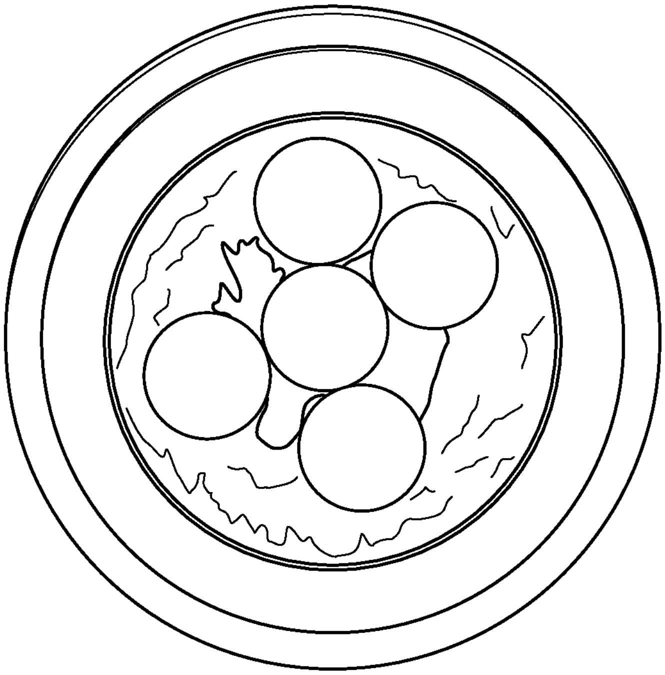
FIG. 18 is an image illustrating example milling spheres and a sample of iron nitride powder prepared by a ball milling technique.

FIG. 17 is a diagram illustrating a size distribution of a sample powder generated by ball milling. In particular, the diagram shown in FIG. 17 shows the size distribution for sample FeN 90. As shown, the diagram plots a percentage frequency of particle sizes against the particle diameter in micrometers. The diagram also plots a line showing the percentage of undersize particles with respect to particle diameter. FIG. 18 is an image illustrating example milling spheres and a sample of iron nitride powder generated by a ball milling technique. In particular, the image shows sample FeN 90.

Figure 19A:
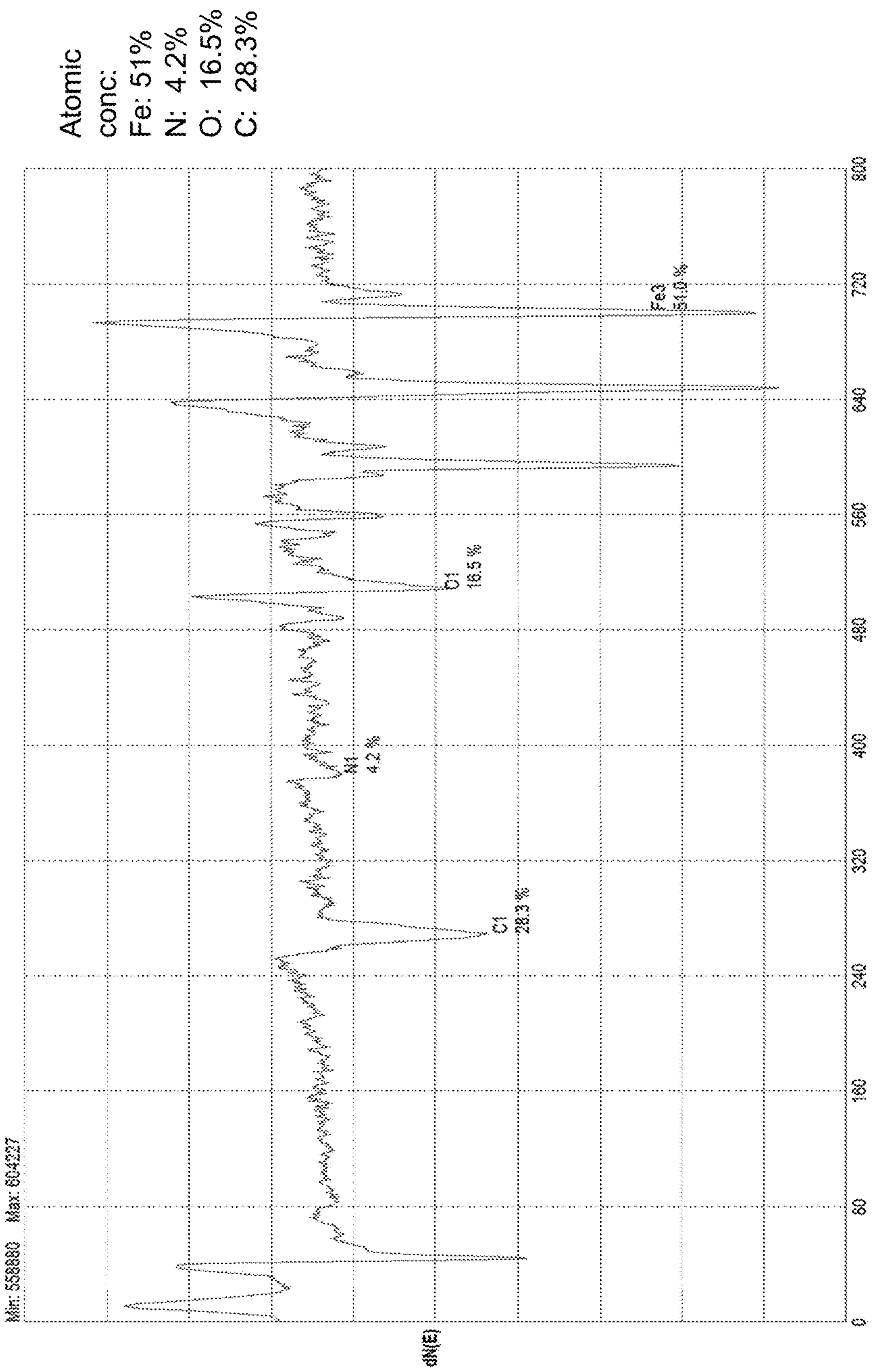
FIGS. 19A-19D are example diagrams illustrating auger electro spectrum (AES) testing results for sample powders including iron nitride.
Figure 19B:
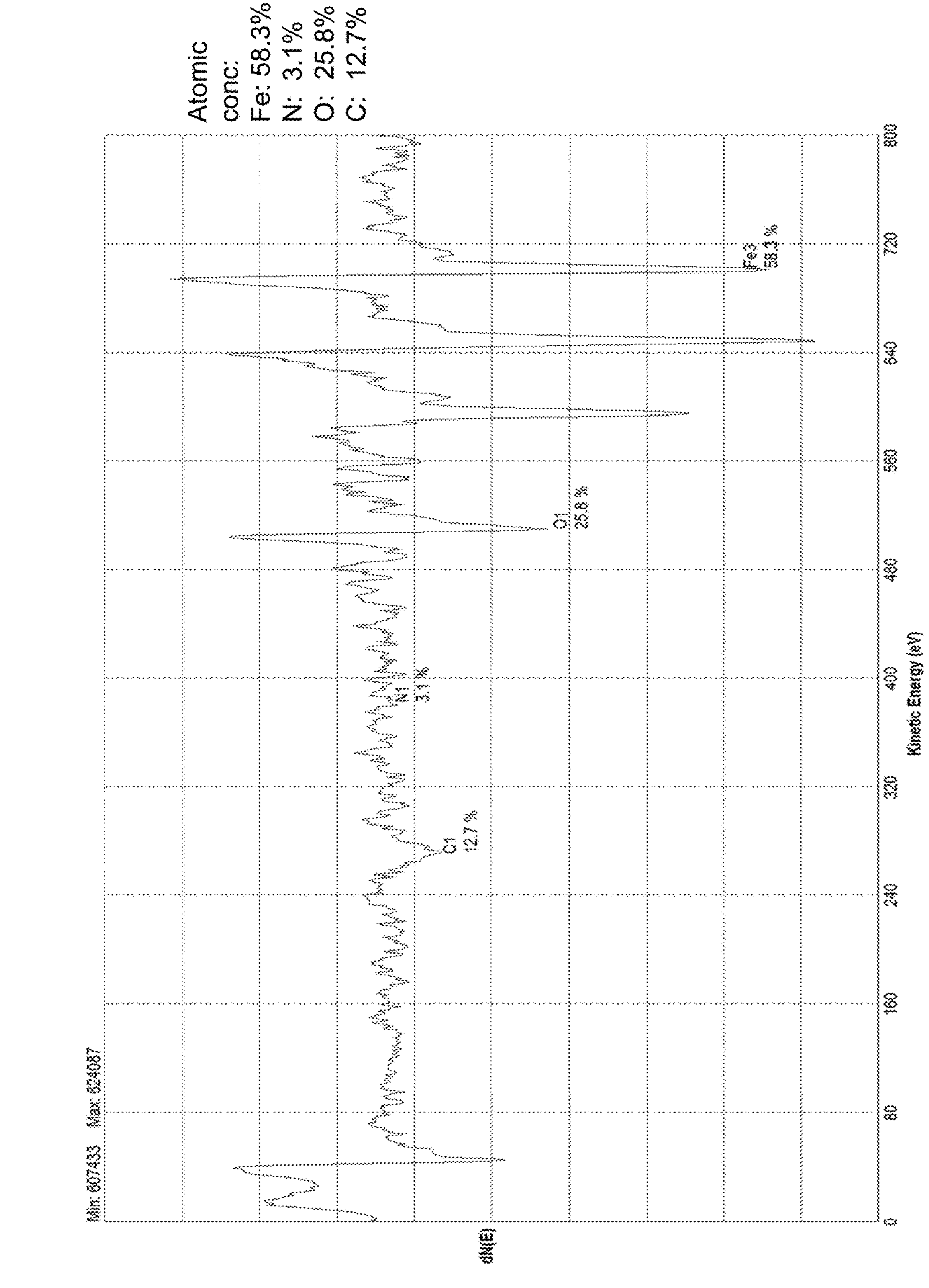
Figure 19C:
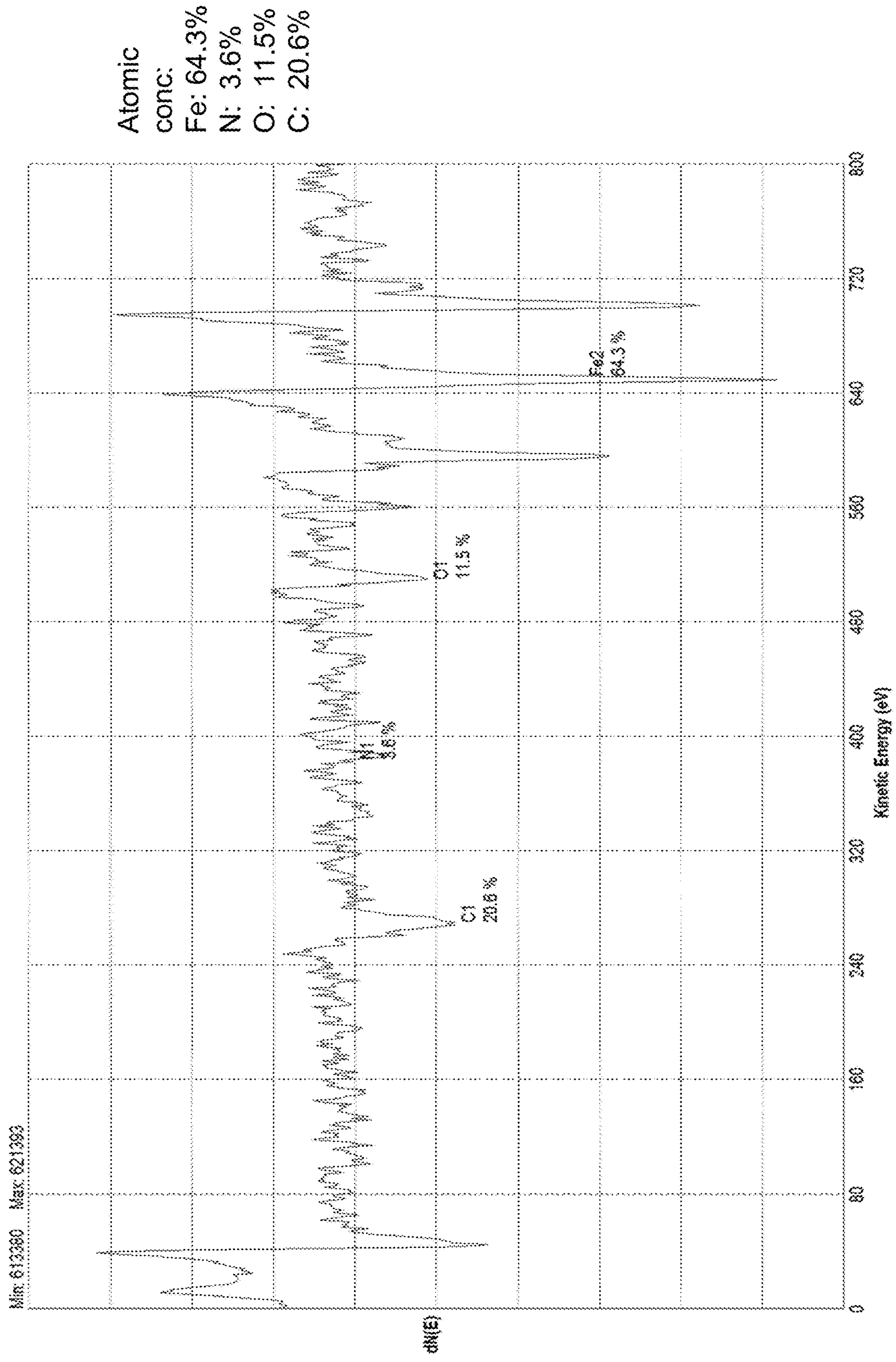
Figure 19D:
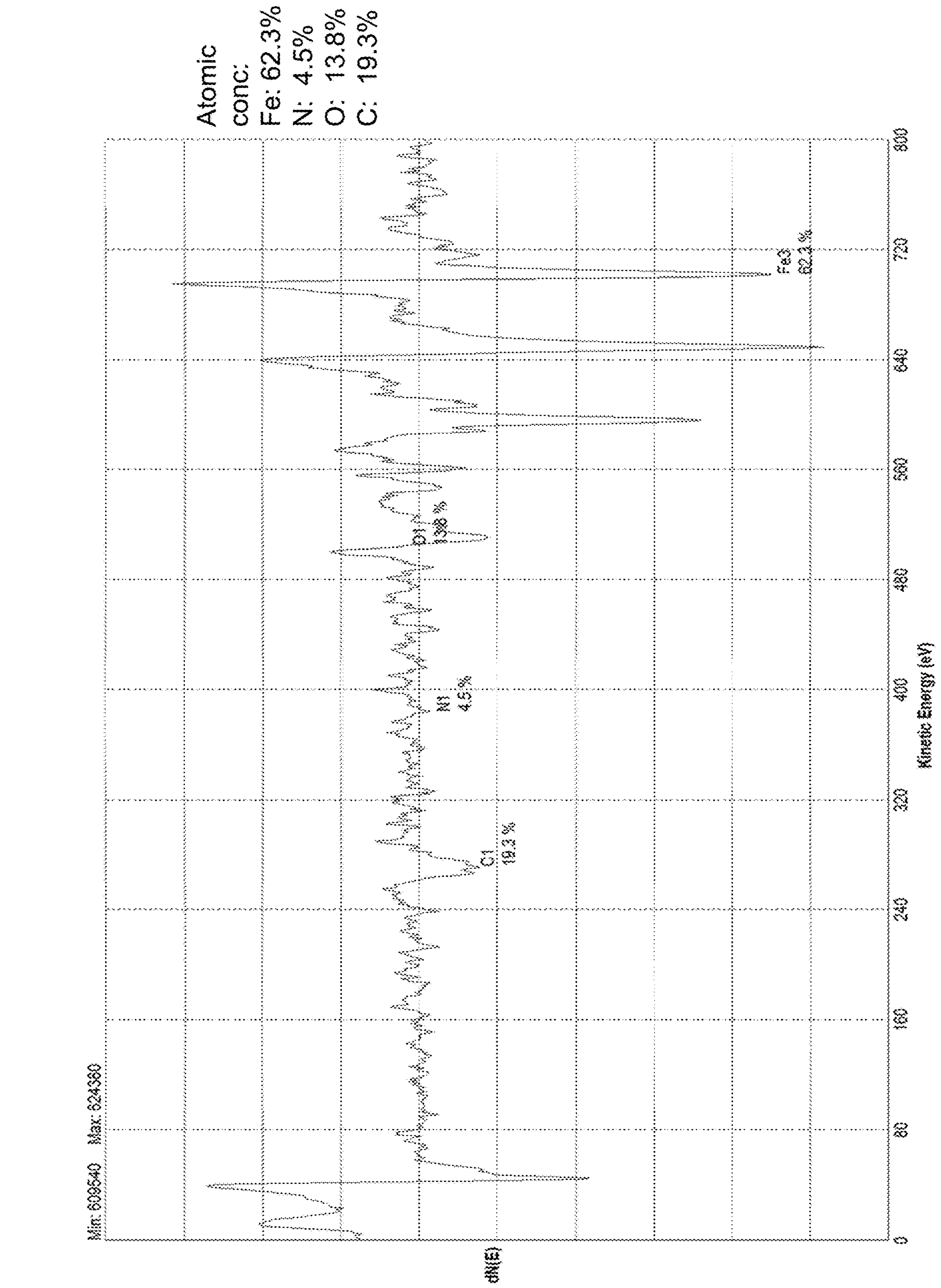

FIGS. 19A-19D are example diagrams illustrating auger electro spectrum (AES) testing results for sample powders including iron nitride. FIG. 19A shows that the composition of sample FeN 90 was about 51 atomic percent (at. %) iron (Fe), about 4.2 at. % nitrogen (N), about 16.5 at. % oxygen (O), and about 28.3 at. % carbon (C). Further, FIG. 19B shows that the composition of sample FeN 91 was about 58.3 at. % Fe, about 3.1 at. % N, about 25.8 at. % O, and about 12.7 at. % C. FIG. 19C shows that the composition of sample FeN 92 was about 64.3 at. % Fe, about 3.6 at. % N, about 11.5 at. % O, and about 20.6 at. % C. In addition, FIG. 19D shows that the composition of sample FeN 93 was about 62.3 at. % Fe, about 4.5 at. % N, about 13.8 at. % O, and about 19.3 at. % C.

Figure 20A:
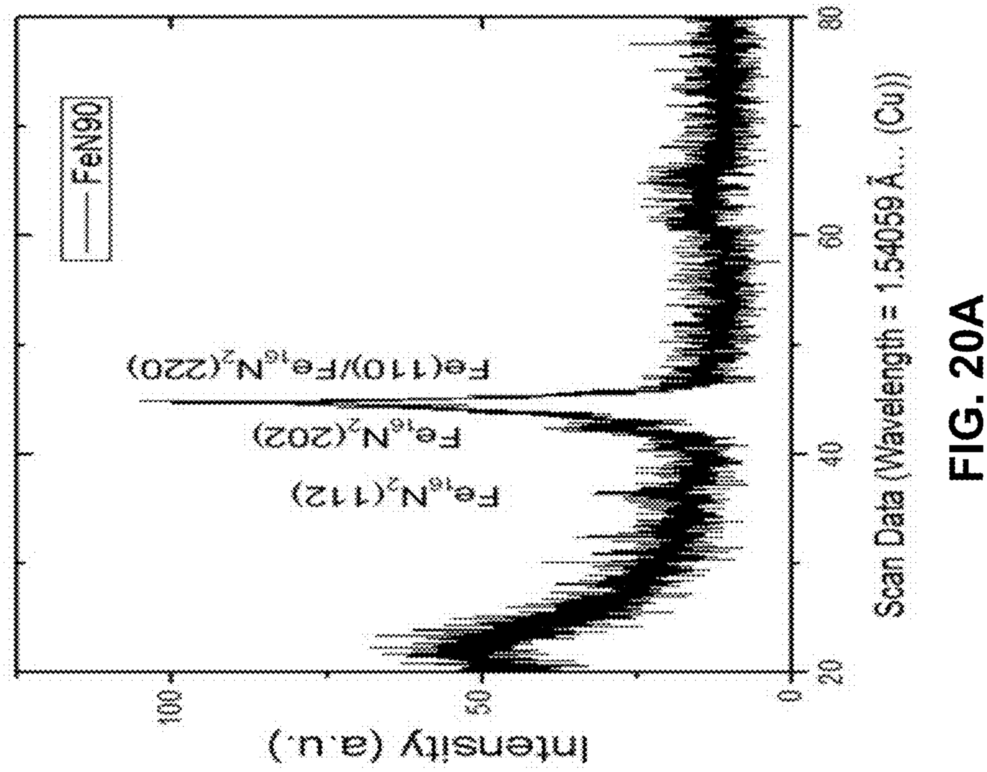
FIG. 20A illustrates an example XRD spectrum of a sample of material including iron nitride, after the material was annealed.

FIG. 20A illustrates an example XRD spectrum of a sample of material including iron nitride, after the material was annealed according to the conditions described with respect to and identified in Table 1 herein. The sample shown in the diagram of FIG. 20A is the FeN 90 sample. As shown in the XRD spectrum, after annealing and cooling the FeN 90 sample to ambient (room) temperature, the resulting powder containing particles including iron nitride included at least $Fe_{16}N_2$(112), $Fe_{16}N_2$(202), and Fe(11)/$Fe_{16}N_2$(220) crystal phases.

Figure 20B:
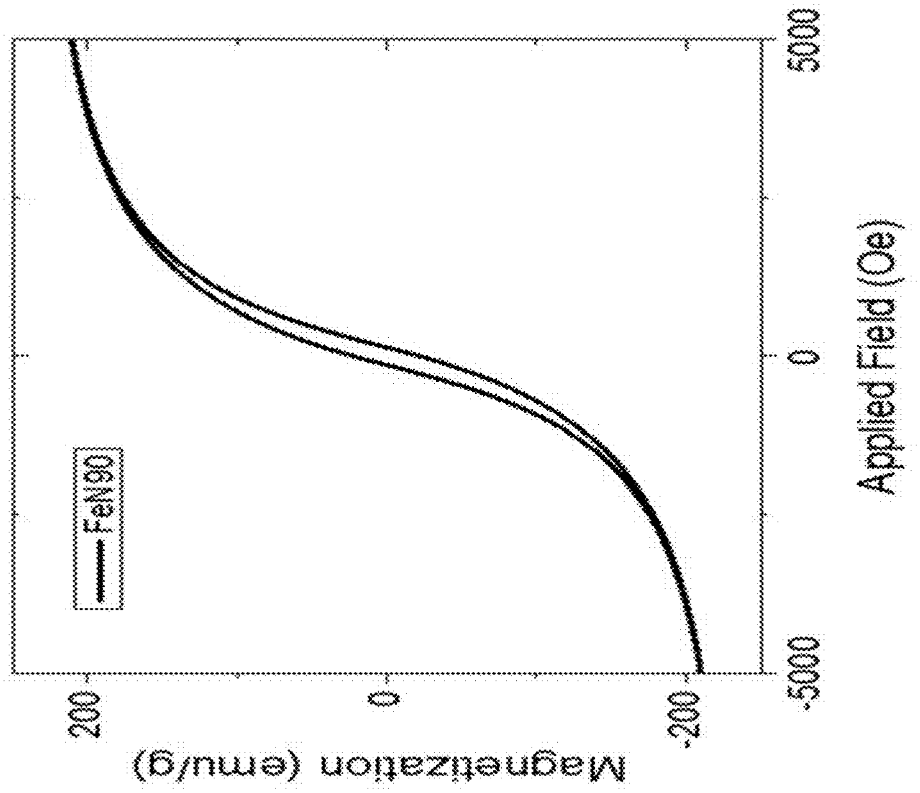
FIG. 20B is an example diagram of magnetization versus applied magnetic field for a sample of material including iron nitride, after the material was annealed.

FIG. 20B is an example diagram of magnetization versus applied magnetic field for a sample of material including iron nitride, after the material was annealed according to the conditions described with respect to and identified in Table 1. The magnetization was measured using a superconducting susceptometer (a Superconducting Quantum Interference Device (SQUID)) available under the trade designation MPMS®-55 from Quantum Design, Inc. As shown in FIG. 20B and Table 2 above, the sample, FeN 90, had a coercivity of 540 Oe and a saturation magnetization of about 209 emu/g.

Figure 21:
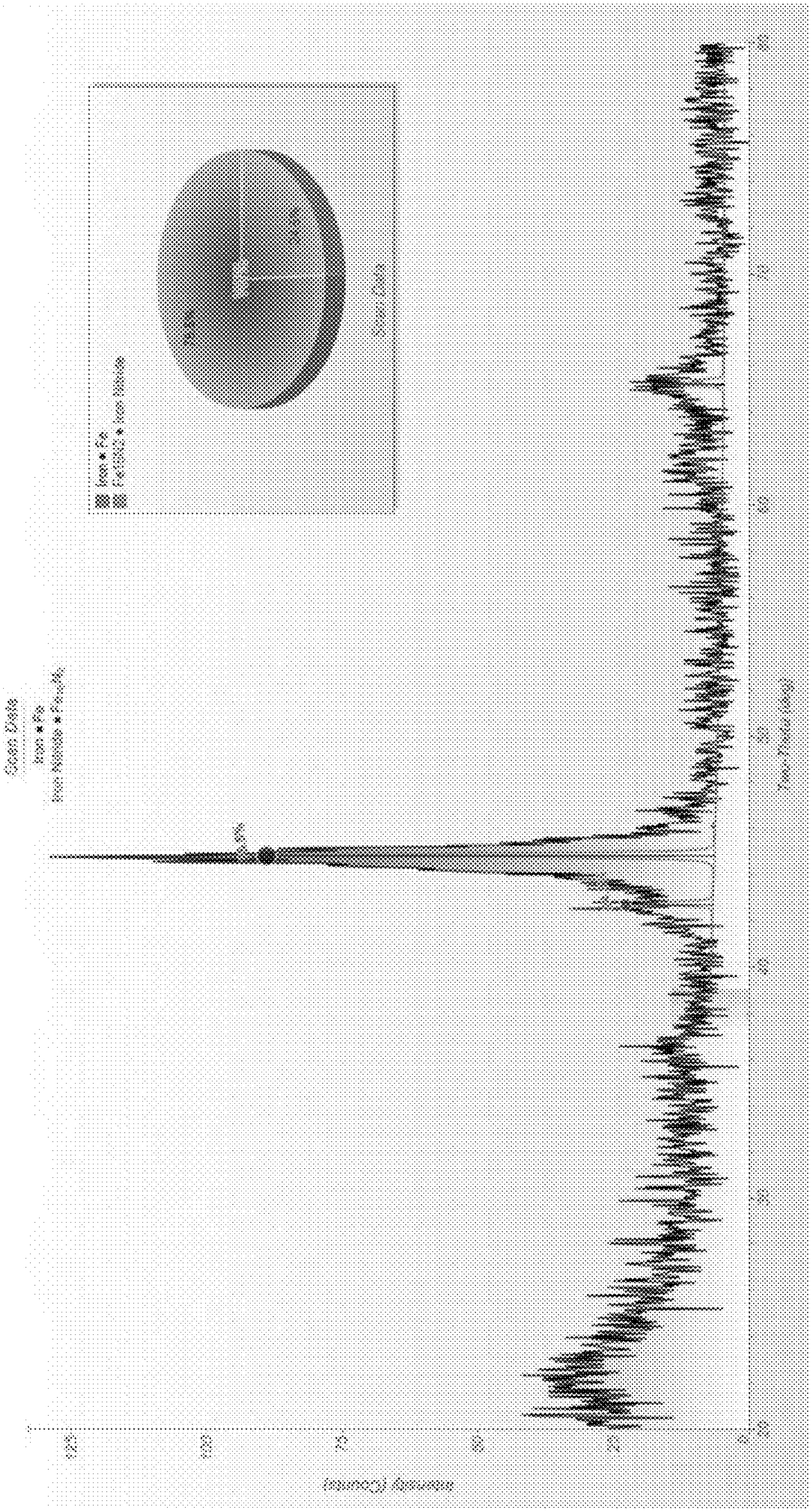
FIG. 21 is an example XRD spectrum of a sample of material including iron nitride, after the material was annealed.

FIG. 21 is an example XRD spectrum of a sample of material including iron nitride, after the material was annealed according to the conditions described with respect to and identified in Table 1. As shown in the XRD spectrum, the sample FeN 90 included a $Fe_{16}N_2$ phase, with the percentage of the $Fe_{16}N_2$ phase volume being about 24.5% and the volume of Fe being about 75.5%.

Figure 22:
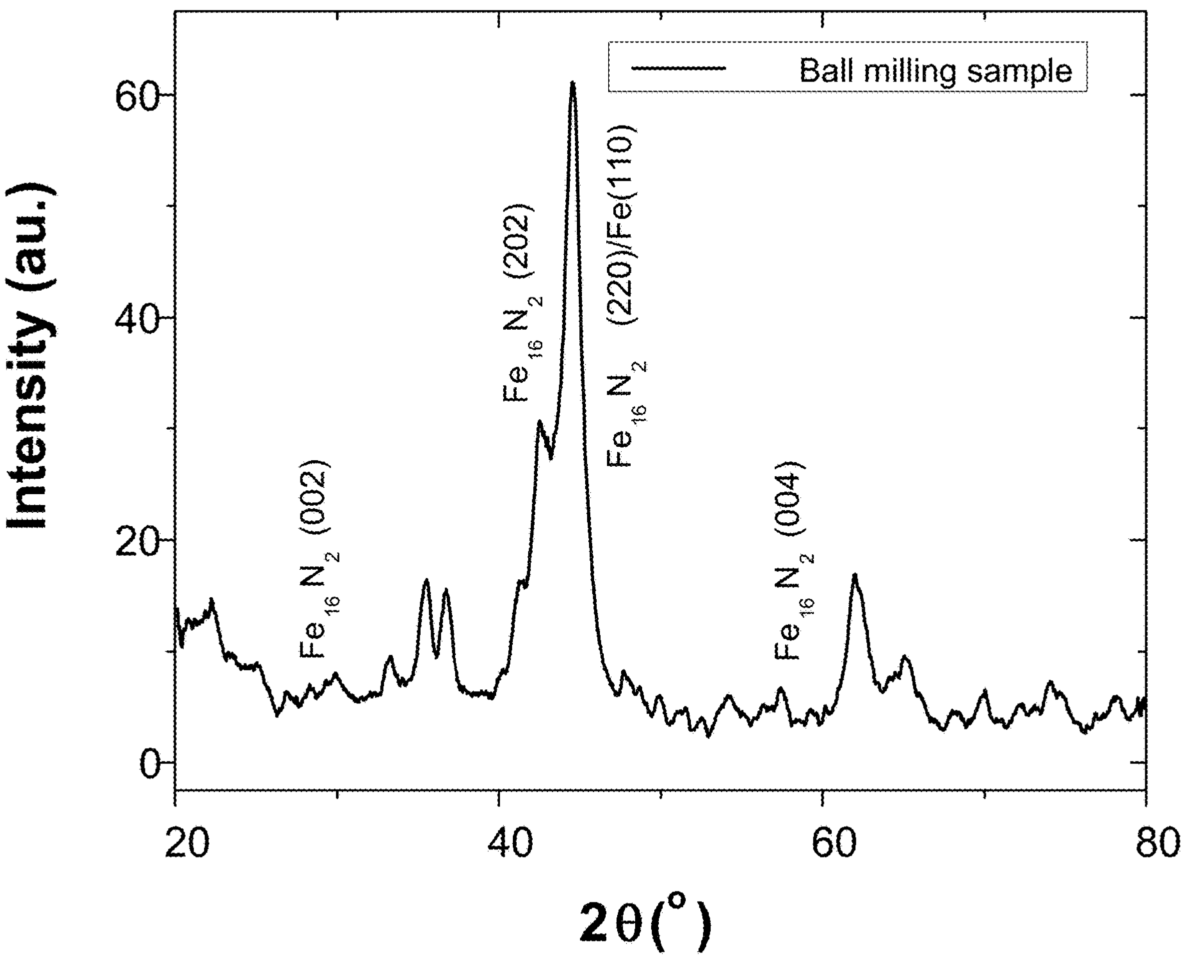
FIG. 22 is another example XRD spectrum of a sample of material including iron nitride, after the material was annealed.

FIG. 22 is another example XRD spectrum of a sample of material including iron nitride, after the material was annealed at a temperature of about 220° C. for about 20 hours. As shown in the XRD spectrum, a sample FeN 106 included $Fe_{16}N_2$ crystal phases, with the total percentage of $Fe_{16}N_2$ phase volumes being about 47.7% and the volume of Fe being about 52.3%. The XRD spectrum of FIG. 22 is a smoothed version of the spectrum shown in FIG. 23. The sample FeN 106 was prepared by ball milling pure iron pieces with ammonium nitrate in ajar of the PM 100 milling apparatus for about 20 hours. The jar was rotated at a speed of about 650 rpm. The steel balls utilized for milling had a diameter of about 10 mm, and the mass ratio between the steel balls and pure iron pieces was about 5:1. After milling, the iron nitride-containing material was annealed at about 220° C. for about 20 hours to enhance the formation of at least one $Fe_{16}N_2$ phase domain within the material.

Figure 23:
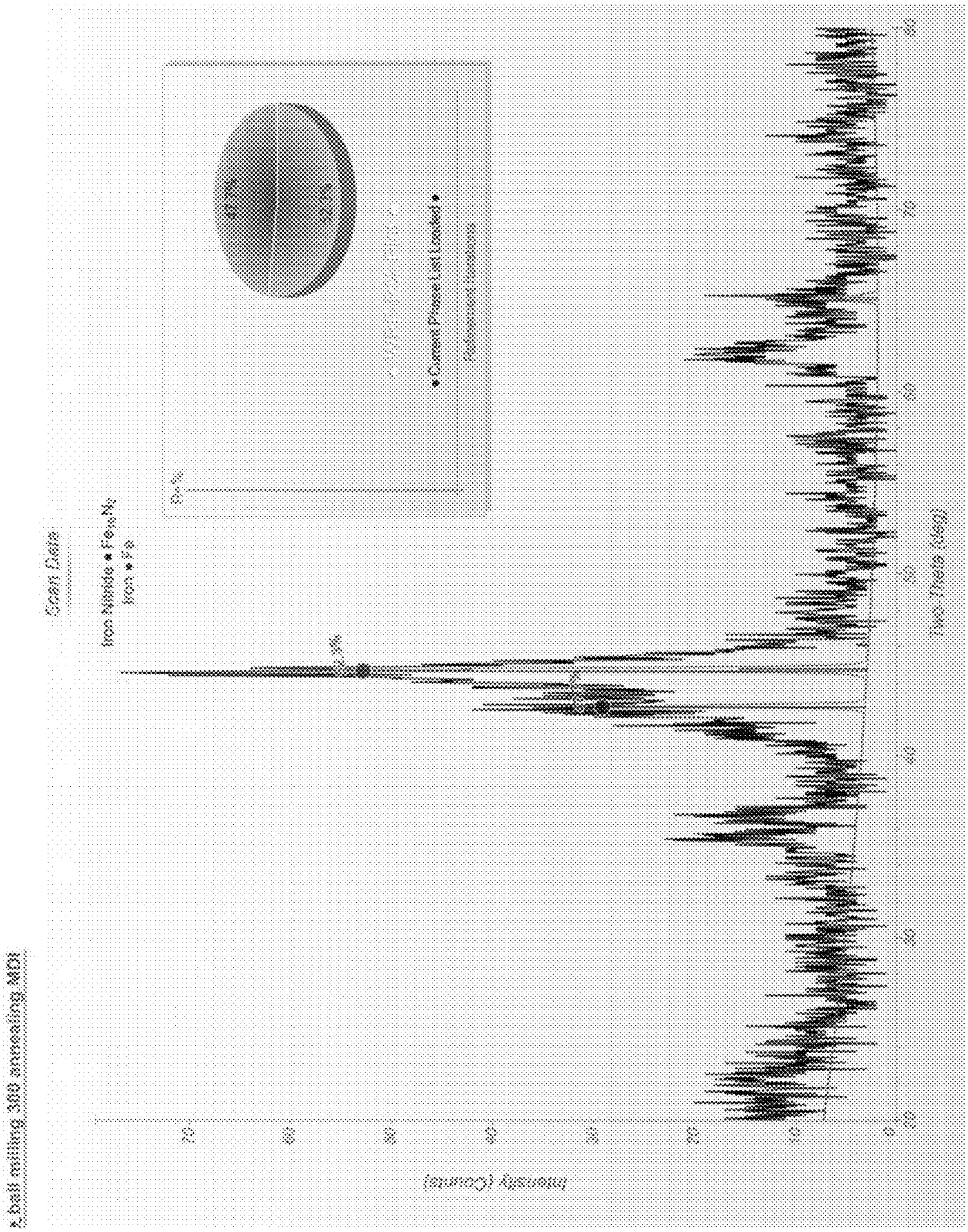
FIG. 23 is another example XRD spectrum of a sample of the material described with respect to FIG. 21.

FIG. 23 is another example XRD spectrum of the sample of material described with respect to FIG. 22. The spectrum shown in FIG. 23 is a rougher version of the smoothed spectrum shown in FIG. 22. As shown in the XRD spectrum in FIG. 23, the sample FeN 106 included a $Fe_{16}N_2$ phase, with the percentage of the $Fe_{16}N_2$ phase volume being about 47.7% and the volume of Fe being about 52.3%.

Figure 24:
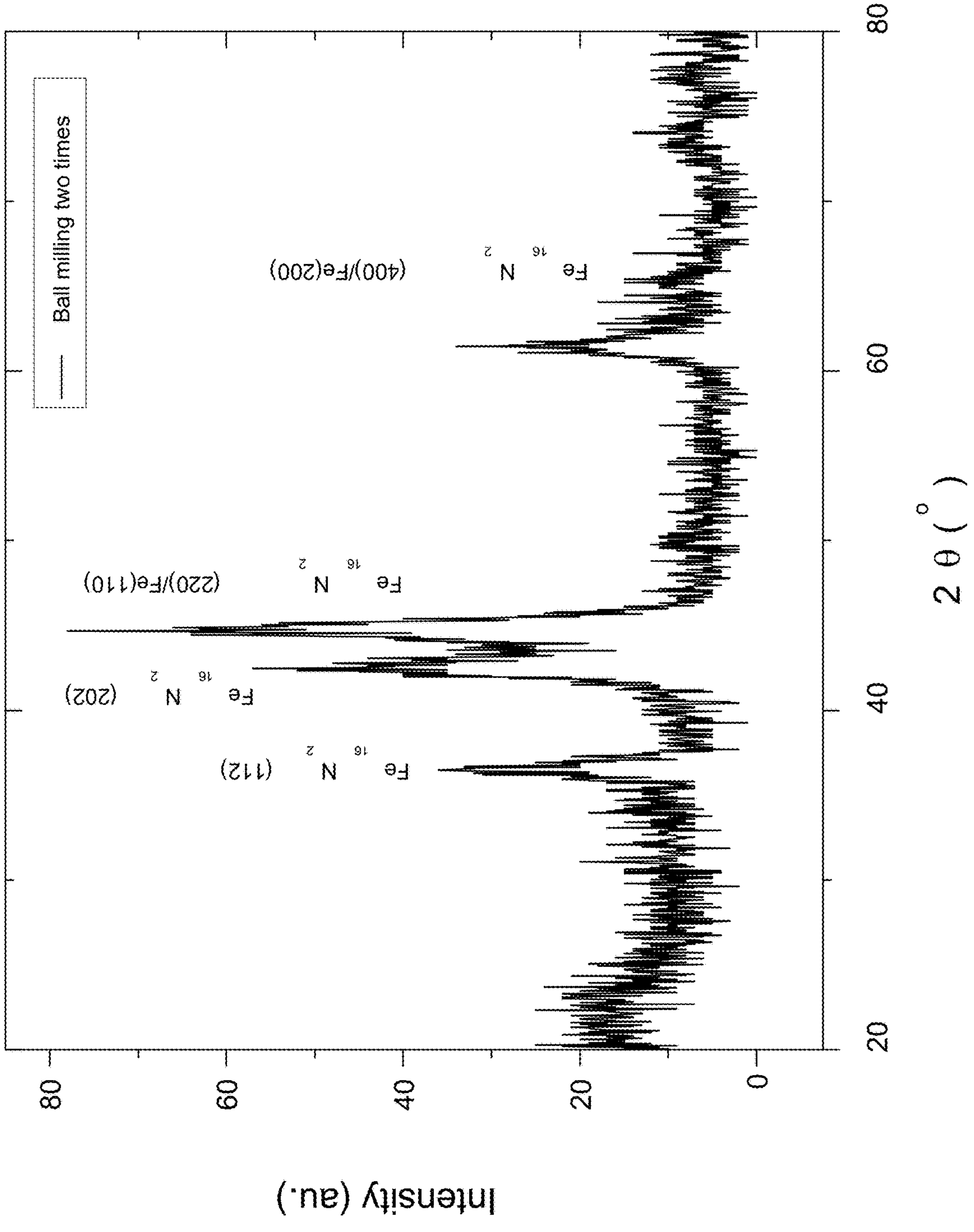
FIG. 24 is another example XRD spectrum of a sample of material including iron nitride, after the material was annealed.

FIG. 24 is another example XRD spectrum of a sample of material including iron nitride, after the material was annealed. The sample, FeN 107, was prepared by milling pure iron pieces with ammonium nitrate in the PM 100 planetary ball milling apparatus for two milling periods, using steel milling spheres having a diameter of about 10 mm. The first milling period lasted about 20 hours, and the second milling period also lasted for about 20 hours. The twice-milled FeN 107 sample was then annealed at a temperature of about 220° C. for about 20 hours. As shown in the XRD spectrum, the sample FeN 107 included multiple $Fe_{16}N_2$ phase domains, with the total percentage of the $Fe_{16}N_2$ phase domain volumes in the sample being about 71.1%, and the volume of Fe in the sample being about 28.9%.

Various examples have been described. These and other examples are within the scope of the following claims.

What is claimed is:

1. A material comprising:

an anisotropic particle comprising at least one iron nitride crystal, wherein the anisotropic particle has an aspect ratio of at least 2.2, wherein the aspect ratio comprises the ratio of the length of a longest dimension of the anisotropic particle to the length of a shortest dimension of the anisotropic particle, and wherein the longest dimension and the shortest dimension are substantially orthogonal, wherein the at least one iron nitride crystal's magnetic easy axis is substantially parallel to the longest dimension of the anisotropic particle;

wherein the at least one iron nitride crystal comprises a plurality of iron nitride crystals, and wherein the respective <001> crystal axes of the plurality of iron nitride crystals are substantially parallel;

wherein the length of the anisotropic particle measured in the direction of the substantially parallel <001> crystal axes of the plurality of iron nitride crystals is at least about 2.2 times the length of the anisotropic particle measured in at least one of a substantially orthogonal direction of the <100> crystal axes of the plurality of iron nitride crystals of the anisotropic particle or a substantially orthogonal direction of the <010> crystal axes of the plurality of iron nitride crystals of the anisotropic particle;

wherein the length of the anisotropic particle measured in the direction of the substantially parallel <001> crystal axes is about 1 micron (μm) and the length of the anisotropic particle measured in the direction of at least one of the substantially parallel <100> crystal axes or the substantially parallel <010> crystal axes is between about 200 nanometers (nm) and 500 nm.

2. The material of claim 1, wherein the at least one iron nitride crystal comprises α"-$Fe_{16}N_2$.

3. The material of claim 1, wherein the longest dimension of the anisotropic particle is substantially parallel to the substantially parallel respective <001> crystal axes of the plurality of iron nitride crystals.

4. The material of claim 1, wherein at least some iron nitride crystals of the plurality of iron nitride crystals comprise at least one α"-$Fe_{16}N_2$ phase domain.

5. The material of claim 1, wherein the anisotropic particle comprises a plurality of anisotropic particles.

6. The material of claim 5, wherein the respective longest dimensions of respective particles of the plurality of anisotropic particles are substantially parallel.

7. A bulk permanent magnet comprising the material of claim 5.

8. The material of claim 1, wherein the anisotropic particle has a shape comprising that of a needle, flake, or lamination.

9. A method of producing the material of claim 1, comprising:

aligning a plurality of anisotropic particles by at least exposing the anisotropic particles to a magnetic field, such that the longest dimensions of respective anisotropic particles of the plurality of anisotropic particles are substantially parallel, wherein at least some anisotropic particles of the plurality of anisotropic particles comprise iron nitride and have an aspect ratio of at least 2.2, wherein each anisotropic particle of the plurality of anisotropic particles includes at least one iron nitride crystal, and wherein the respective <001> crystal axes of at least some of the at least one iron nitride crystals of the plurality of anisotropic particles are substantially parallel to the longest dimensions of the respective anisotropic particles; and joining the plurality of anisotropic particles to form a bulk material comprising iron nitride.

10. The method of claim 9, wherein the magnetic field has a strength between about 0.01 Tesla (T) and about 50 T.

11. The method of claim 9, wherein joining the plurality of anisotropic particles comprises at least one of sintering, adhering, alloying, soldering, using a resin or binder on, using shock compression on, or using electrodischarge on the plurality of anisotropic particles.

12. The method of claim 11, wherein sintering the plurality of anisotropic particles comprises heating the plurality of anisotropic particles at a temperature between about 23° C. and about 200° C.

13. The method of claim 9, wherein the bulk material comprises a bulk permanent magnet.

14. The method of claim 9, wherein the iron nitride comprises at least one $\alpha''$-$Fe_{16}N_2$ phase domain.

15. The method of claim 9, wherein the anisotropic particle has a shape comprising that of a needle, flake, or lamination.

* * * * *